US012616632B2

(12) United States Patent
Wang

(10) Patent No.: US 12,616,632 B2
(45) Date of Patent: May 5, 2026

(54) SEX TOY

(71) Applicant: Dongguan Mimao Electronic Technology Co., Ltd., Dongguan (CN)

(72) Inventor: Qinling Wang, Heyuan (CN)

(73) Assignee: Dongguan Mimao Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/231,585

(22) Filed: Jun. 9, 2025

(65) Prior Publication Data

US 2025/0295552 A1 Sep. 25, 2025

Related U.S. Application Data

(63) Continuation-in-part of application No. 18/954,449, filed on Nov. 20, 2024, now Pat. No. 12,324,782, which is a continuation-in-part of application No. 18/516,984, filed on Nov. 22, 2023, now Pat. No. 12,161,598.

(51) Int. Cl.
*A61H 19/00* (2006.01)

(52) U.S. Cl.
CPC ..... *A61H 19/32* (2013.01); *A61H 2201/0153* (2013.01); *A61H 2201/123* (2013.01); *A61H 2201/1692* (2013.01)

(58) Field of Classification Search
CPC .... A61H 2201/1692; A61H 2201/0153; A61H 19/32; A61H 19/00; A61H 2015/0021; A61H 2015/0007; A61H 15/00
USPC ........................................................... 600/38
See application file for complete search history.

(56) References Cited

U.S. PATENT DOCUMENTS

| | | | | |
|---|---|---|---|---|
| 6,190,339 | B1 | 2/2001 | Imazaike et al. | |
| 10,869,807 | B2 * | 12/2020 | Nelson | A61H 15/00 |
| 12,233,016 | B2 * | 2/2025 | Ann | A61H 1/008 |
| 2002/0161315 | A1 * | 10/2002 | Harris | A61H 23/0254 601/111 |
| 2012/0203151 | A1 * | 8/2012 | Kleiman | A61H 15/00 601/112 |
| 2018/0021212 | A1 * | 1/2018 | Matsuura | A61H 9/0057 600/38 |
| 2019/0209359 | A1 | 7/2019 | Trost et al. | |
| 2022/0096320 | A1 | 3/2022 | Lu | |
| 2024/0225950 | A1 * | 7/2024 | Liu | A61H 19/32 |

FOREIGN PATENT DOCUMENTS

WO 2014096476 A1 6/2014

OTHER PUBLICATIONS

The Extended European Search Report Issued on Aug. 12, 2025 for Corresponding European Patent Application No. 24214864.1.

* cited by examiner

*Primary Examiner* — Samuel G Gilbert

(57) ABSTRACT

A sex toy, includes a support base; and a first massage portion mounted to the support base, wherein the first massage portion includes at least one first massage roller and at least one second massage roller that are arranged opposite to each other, and a gap is defined between the at least one first roller and the at least one second roller for accommodating a male penis, and wherein the at least one first massage roller and the at least one second roller are rotatable to stimulate two opposite sides of the male penis.

20 Claims, 16 Drawing Sheets

FIG. 11

SEX TOY

CROSS-REFERENCE TO RELATED APPLICATIONS

The present application claims a Continuation in Part Application of U.S. patent application Ser. No. 18/954,449, filed on Nov. 20, 2024 which is a Continuation in Part Application of U.S. patent application Ser. No. 18/516,984, filed on Nov. 22, 2023, and also claims the priority of Chinese Utility Model application No. 202520175775.6, filed on Jan. 26, 2025, the entire contents of which are hereby incorporated by reference.

TECHNICAL FIELD

The present disclosure relates to the technical field of sexual stimulation, and in particular to a sex toy.

BACKGROUND

With the improvement of living standards and the increase of pressure on people's life and work, sex toys, such as masturbators, are welcomed by more and more people. Most of the typical masturbators are equipped with vibration motors in their casings to stimulate the users' genitalia by means of high-frequency vibration for sexual pleasure. However, such sex toys usually provide monotonous stimulation effects, resulting in insufficient stimulation effects that are therefore unable to satisfy the users.

SUMMARY

An object of the present disclosure is to provide a sex toy with a better stimulation effect to improve the users' sexual experience.

In order to achieve the above objective, a technical solution of the present disclosure provides a sex toy, including:

- a support base; and
- a first massage portion mounted to the support base,
- wherein the first massage portion comprises at least one first massage roller and at least one second massage roller that are arranged opposite to each other, and a gap is defined between the at least one first roller and the at least one second roller for accommodating a male penis, and
- wherein the at least one first massage roller and the at least one second roller are rotatable to stimulate two opposite sides of the male penis.

Another technical solution of the present disclosure provides a sex toy, including:

- a support base extending in an axial direction; and
- a first massage portion mounted to the support base, the first massage portion comprising a first massage roller arranged at a first side of the support base and a second massage roller respectively arranged at a second side of the support base, the first massage roller and second massage roller are spaces in a lateral direction of the support base with a gap defined there between for accommodating a male penis;
- wherein the first massage roller and the second massage roller are rotatable, and wherein in use, circumferential surfaces of the first massage roller and the second massage roller are in rotation contact with the male penis so as to stimulate two opposite sides of the male penis through.

Compared with the prior art, the sex toy of the present disclosure is able to massage the penis by at least two rotatable massage rollers. The penis could be inserted into the gap between the at least one first roller and the at least one second roller, sandwiched by the at least one first roller and the at least one second roller. When each massage roller rotates, it achieves rolling massage stimulation on opposite sides of the penis.

BRIEF DESCRIPTION OF DRAWINGS

In order to more clearly illustrate the technical solutions of the embodiments of the present disclosure, the following provides a brief description of the drawings accompanying the embodiments. It should be noted that the drawings presented only show some embodiments of the present disclosure. Based on these drawings, those skilled in the art can obtain other drawings without any creative effort.

LIST OF REFERENCE SIGNS

Figure 1A:
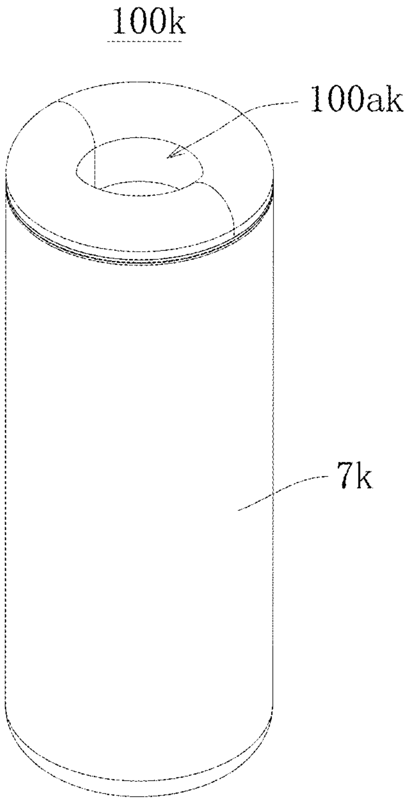
FIG. 1*a* is an isometric, assembled view of a sex toy of one embodiment of the present disclosure.
Figure 1B:
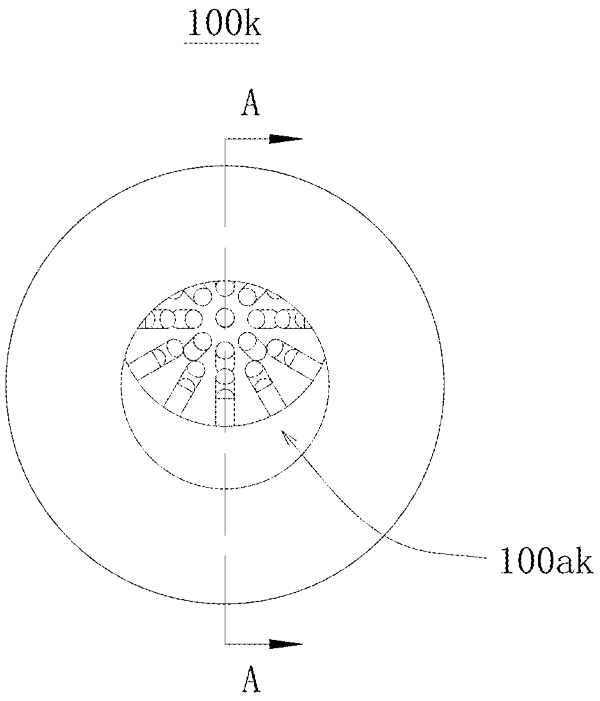
FIG. 1*b* is a schematic view of FIG. 1*a*, viewed from another aspect.
Figure 1C:
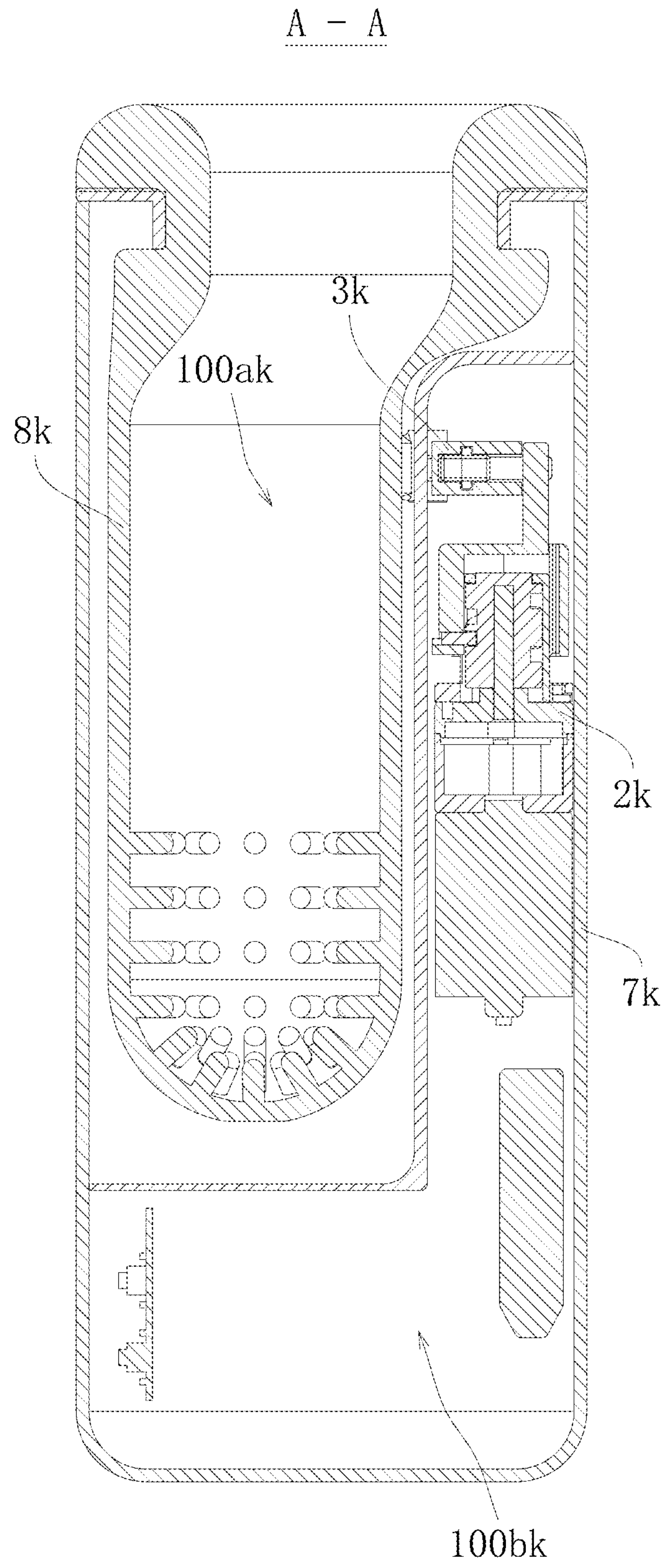
FIG. 1*c* is a sectional view of the sex toy of FIG. 1*b*, taken along line A-A.
Figure 1D:
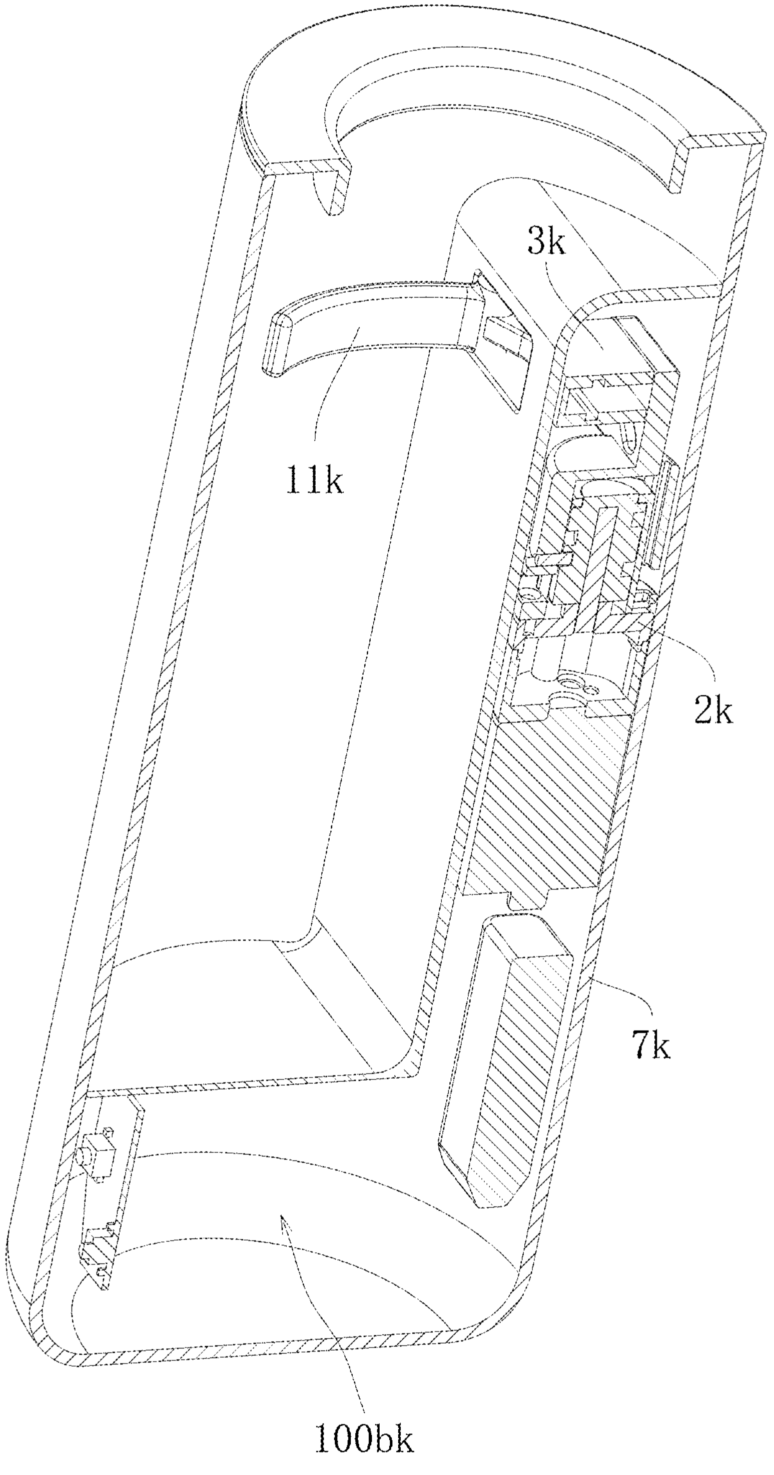
FIG. 1*d* is a schematic view of the sex toy of FIG. 1*c* viewed from another aspect, wherein an inner tube is removed for clarity.
Figure 1E:
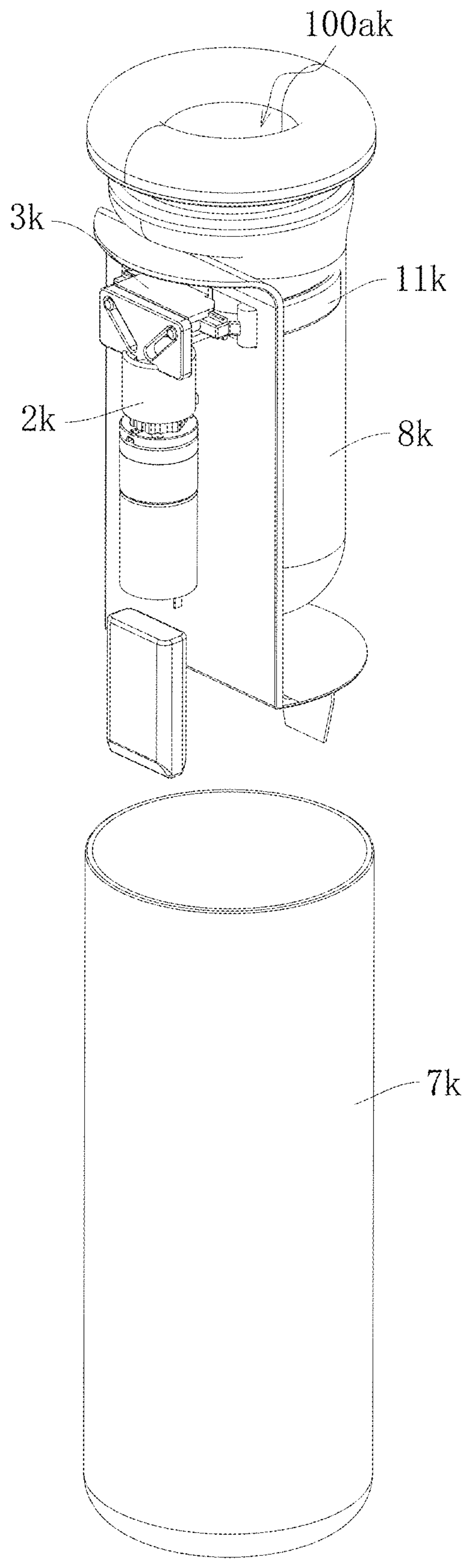
FIG. 1*e* is an exploded view of the sex toy of FIG. 1*a*.
Figure 1F:
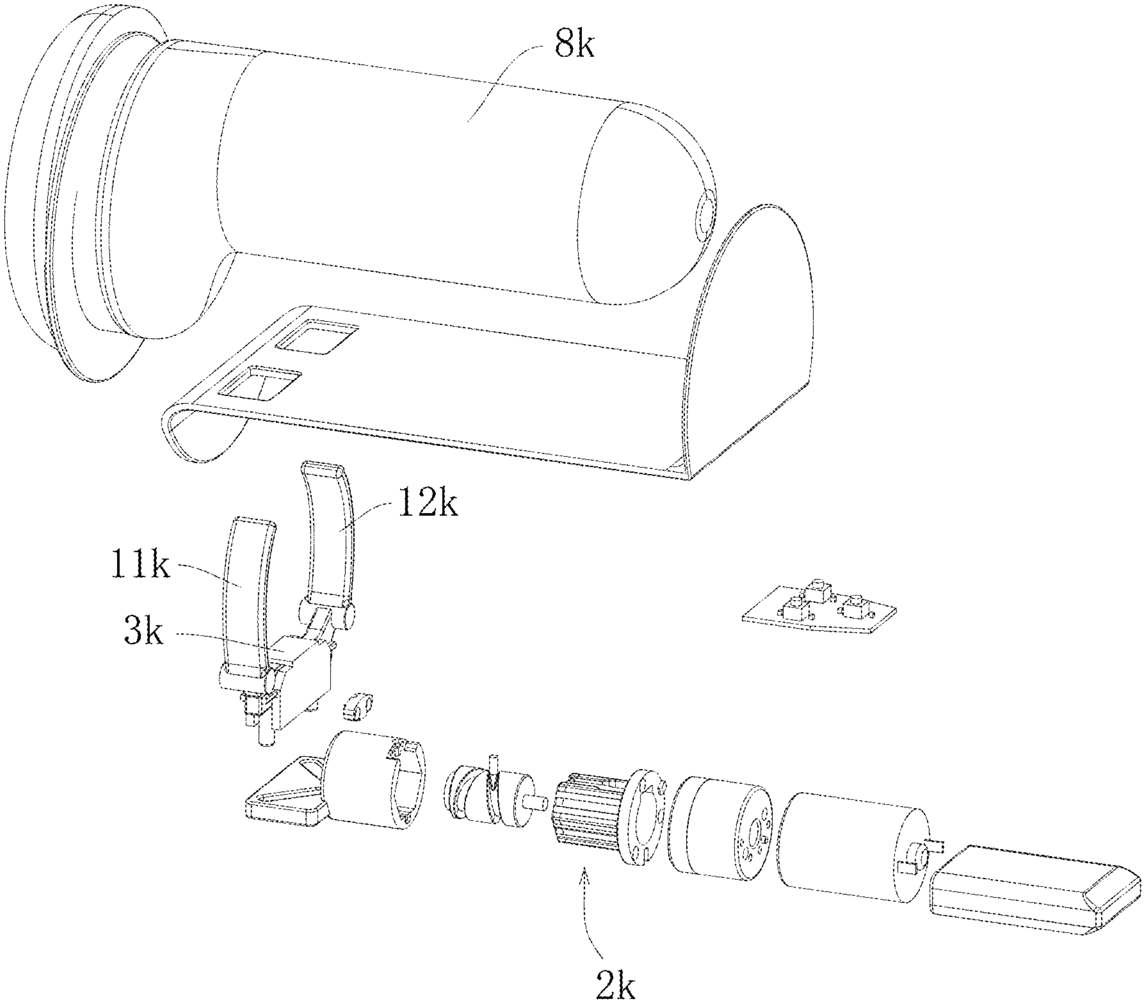
FIG. 1*f* is a further exploded view of the sex toy of FIG. 1*e*, wherein main structures of the inner tube, a drive assembly, and a massage arm are shown schematically.

Sex toy 100*k*; stimulation chamber 100*ak*; first massage arm 11*k*; second massage arm 12*k*; drive assembly 2*k*; guide member 3*k*; outer tube 7*k*; inner tube 8*k*; accommodating chamber 100*bk*; support base 1; massage space 1*a*; first massage portion 10; partition 11; entrance 12; lip 13; plate 14; groove 111; second massage portion 20; massage cavity 21; massage cylinder 22; rigid cylinder body 221; flexible cylinder body 222; mounting ring 23; fourth motor 24; fourth motor gearbox 25; fixing member 26; elongated slot 261; massage roller 30; gap 30*a*; massage motor assembly 31; vibration motor 311; first motor 312; first motor gearbox 313; rolling core 32; flexible layer 33; clamping mechanism 40; moving end of the clamping mechanism, 401; base plate 41; clamping actuator 42; first transmission assembly 43; sliding slot 411; guide rail 412; second motor 421; second motor gearbox 422; gear 431; first rack 432; second rack 433; extension rod 434; drive mechanism 50; moving end of the drive mechanism, 501; drive assembly 51; second transmission assembly 52; slider 53; third motor 511; third motor gearbox 512; lead screw 521; sleeve 522; threaded groove 5211; elongated groove 5221; sliding portion 531; connecting portion 532; guiding portion 533; circuit board 60; battery 61; negative pressure generator 70; first pipeline 71; second pipeline 72; valve 73.

DESCRIPTION OF EMBODIMENTS

For a better understanding of the present disclosure, embodiment(s) of the present disclosure will be described more comprehensively below with reference to the accompanied drawings. One or more embodiments of the present disclosure are illustrated in the drawings for a clearer understanding of the technical solutions. However, it should be noted that the present disclosure can be embodied in different forms and is not limited to the embodiment(s) described below.

The same or similar reference numbers in the drawings of the present disclosure correspond to the same or similar elements. It should be noted that the directional terms such as 'upper', 'lower', 'left', and 'right' used in the description of the present disclosure are based on the orientation or positional relationship shown in the drawings, solely for the convenience of description and simplification, and do not indicate or imply that the device or element must have a specific orientation or be constructed or operated in a specific orientation. Therefore, the terms describing the positional relationship in the drawings are only used for illustrative purposes and should not be construed as limitations of the present disclosure. Those skilled in the art can understand the specific meanings of these terms according to specific circumstances.

Moreover, the terms such as 'first', 'second', etc., used in the embodiments of the present disclosure are solely for descriptive purposes and should not be construed as indicating or implying relative importance or the number of the technical features referred to. Therefore, the features defined by 'first' and 'second' may refer to at least one of such features. Furthermore, the expression 'and/or' as used in this description encompasses three possibilities. Taking 'A and/or B' as an example, it includes A alone, B alone, or both A and B together.

Furthermore, the technical solutions of different embodiments may be combined, as long as the combined technical solution is feasible for those skilled in the art. If the technical solutions to be combined are contradictory or cannot be implemented, such a combination should be considered non-existent and outside the protection scope of the present disclosure.

Referring to FIGS. 1*a* to 1*f*, which show a sex toy 100*k* according to one embodiment according to the present disclosure. The sex toy 100*k* includes an outer tube 7*k* and an inner tube 8*k* disposed inside of the outer tube 7*k*. The inner tube 8*k* is hollow and defines a stimulation chamber 100*ak* therein for receiving a male penis. In this embodiment, the stimulation chamber 100*ak* is cylindrical. The inner tube 8*k* includes soft materials at least facing toward the stimulation chamber 100*ak*. An accommodating chamber 100*bk* is formed between the outer tube 7*k* and the inner tube 8*k*. At least two massage arms 11*k*, 12*k* are disposed in the accommodating chamber 100*bk*. The at least two massage arms include a first massage arm 11*k* and a second massage arm 12*k* disposed on radial opposite sides of the inner tube 8*k* respectively.

Exemplarily, the outer tube 7*k* is substantially a hollow cylindrical structure. The inner tube 8*k* is entirely made of soft materials. The accommodating chamber 100*bk* between the outer tube 7*k* and the inner tube 8*k* is used to place massage arms 11*k*, 12*k* and a drive assembly 2*k*. The drive assembly 2*k* is in torque-transmission connection with the at least two massage arms 11*k*, 12*k*, for driving the first massage arm 11*k* and the second massage arm 12*k* to slide towards or away from each other. The first massage arm 11*k* and the second massage arm 12*k* are respectively disposed on opposite radial sides of the inner tube 8*k*. A guide member 3*k* may be fixed on the outer tube 7*k* for guiding the movement directions of the first massage arm 11*k* and second massage arm 12*k*.

The first massage arm 11*k* and the second massage arm 12*k* in the present embodiment can slide towards or away from each other. When the first and second massage arms 11*k*, 12*k* slides towards each other, they press the inner tube 8*k* inwardly towards the stimulation chamber 100*ak*, so as to narrow the radial size of the stimulation chamber 100*ak* and pinch the male penis received therein.

In other words, a pinching function that simulates a human hand holding and kneading the male penis is achieved by sliding movement of the above embodiment of the present disclosure. Furthermore, the present disclosure also provides another embodiment that simulates male penis by rolling function.

Figure 2:
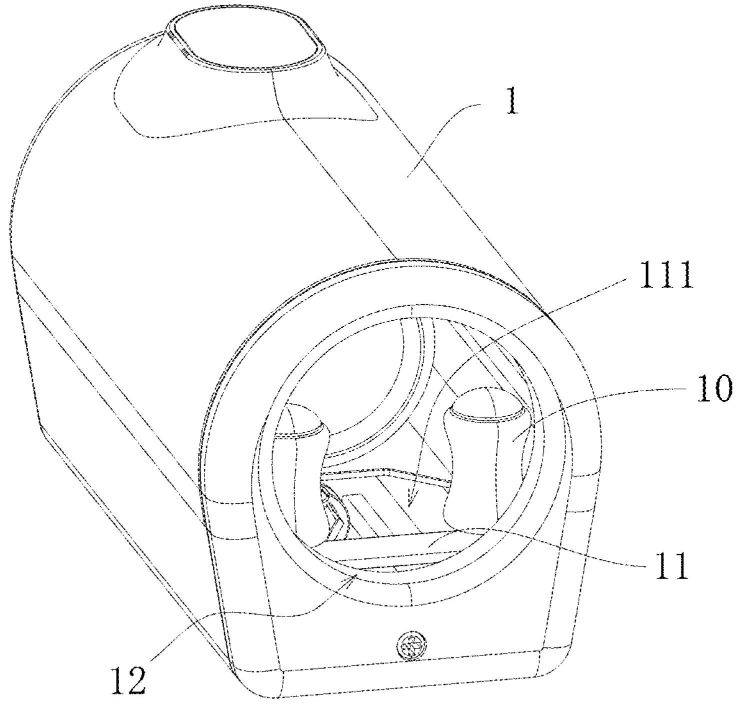
FIG. 2 is a structural schematic view of a sex toy according to another embodiment of the present disclosure.
Figure 3:
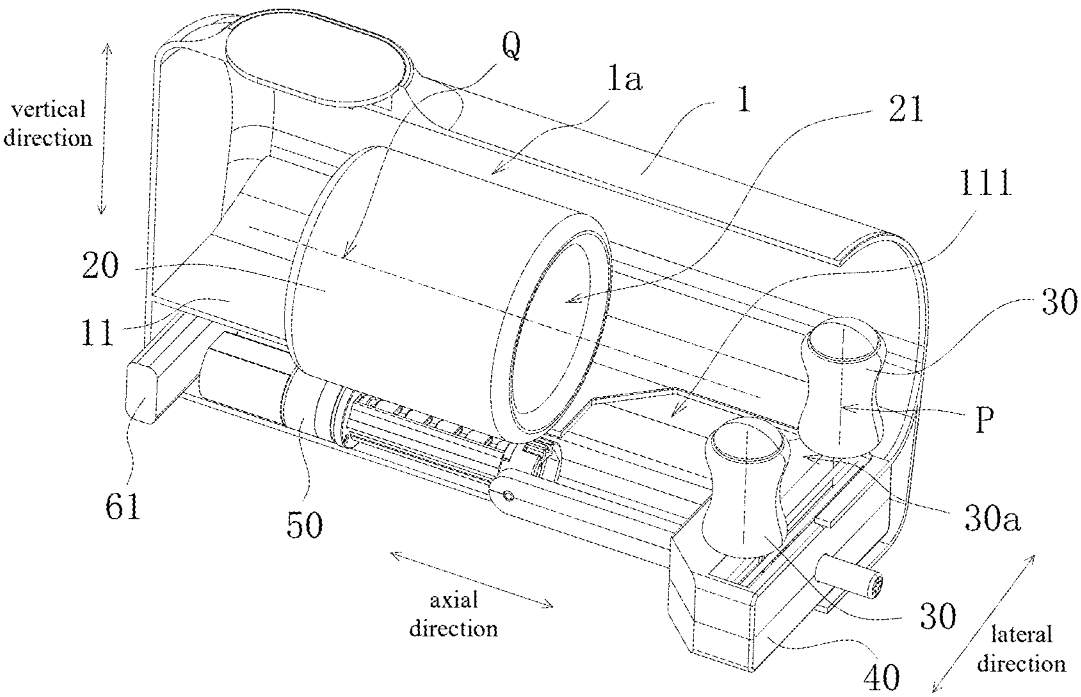
FIG. 3 is a structural schematic view from another view angle of the sex toy shown in FIG. 2, in which a portion of a support base is removed for clarity.
Figure 4:
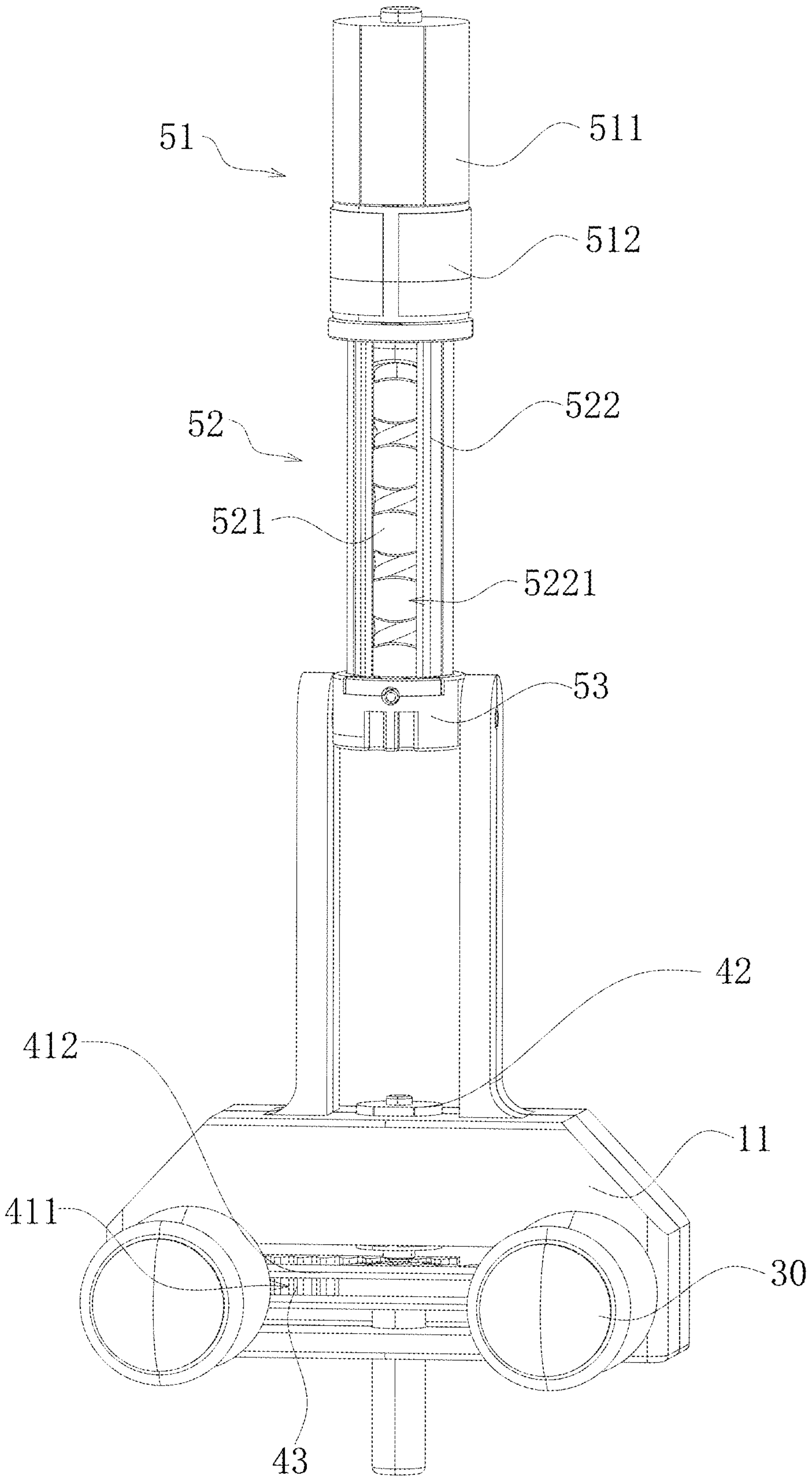
FIG. 4 is a structural schematic view of a first massage portion of the sex toy shown in FIG. 2.
Figure 5:
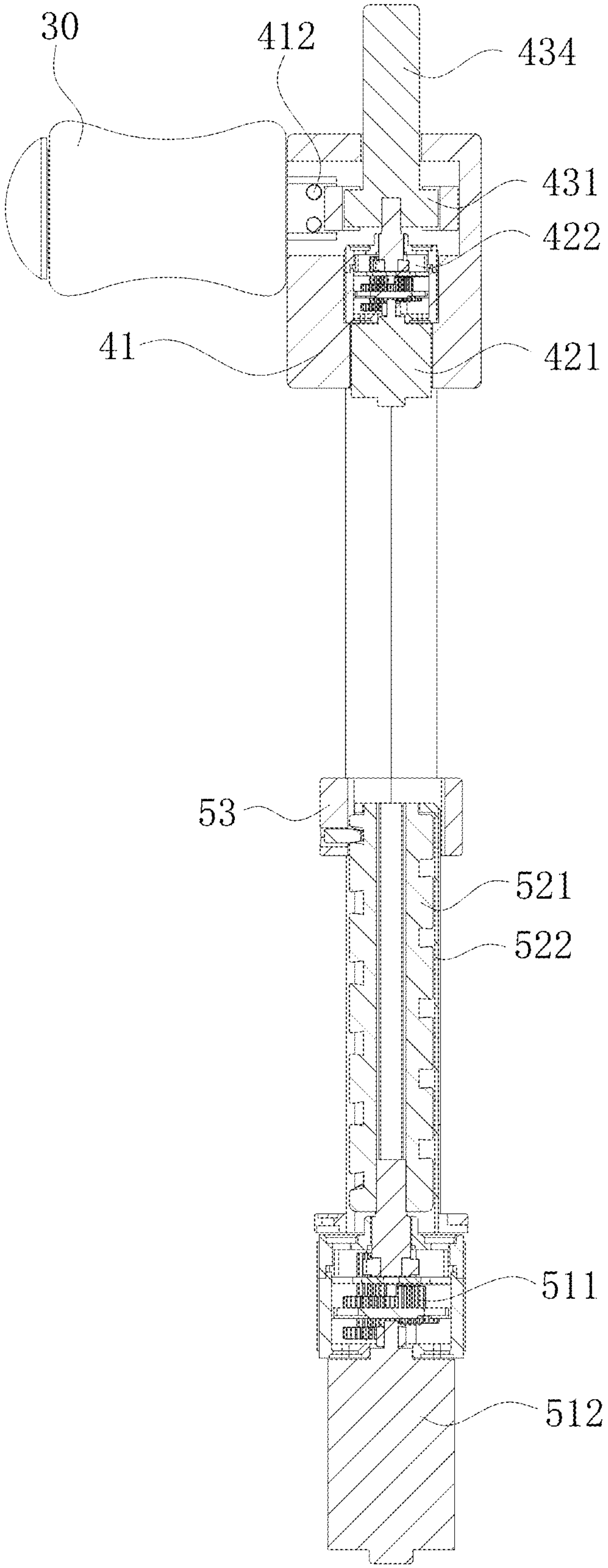
FIG. 5 is a sectional schematic view of the first massage portion of the sex toy shown in FIG. 2.

In another embodiment of the present disclosure, as shown in FIGS. 2 and 3, a sex toy is provided, including a hollow support base 1 and a first massage portion 10 arranged within the support base 1. The support base 1 has an massage space 1*a* extending in an axial direction of the support base 1 for receiving a male penis. Preferably, the massage space 1*a* has a central axis Q extending in the axial direction. The support base 1 also has an entrance 12 at a first axial end of the massage space 1*a* for insertion of the penis. The first massage portion 10 includes at least one first rotatable massage roller 30 and at least one second rotatable massage roller 30. The at least one first roller 30 and the at least one second roller 30 are arranged in the massage space 1*a*, opposite to and spaced from each other with a gap 30*a* defined between the at least one first roller 30 and the at least one second roller 30. Preferably, each massage roller 30 is a solid of revolution, i.e., a three-dimensional structure formed by rotating a two-dimensional planar figure 360 degrees about an axis.

When the penis is inserted in the massage space 1*a* in the axial direction, a portion of the penis is disposed in the gap 30*a* and sandwiched by the at least one first roller 30 and the at least one second roller 30, such that the at least one first roller 30 and the at least one second roller 30 simultaneously stimulate two opposite sides of the penis through circumferential surfaces of the massage rollers 30 when they rotate. That is, when the massage rollers 30 rotate, the portions of the circumferential surface of each massage roller 30 contact and stimulate the penis in sequence to simultaneously stimulate a respective side of the penis.

Compared with the prior art, the penis can be inserted through the entrance 12 of the support base 1 into the gap 30*a* between the at least one first roller 30 and the at least one second roller 30, sandwiched by the at least one first roller 30 and the at least one second roller 30. When the massage rollers 30 rotate, they simultaneously achieve rolling massage stimulations on opposite sides of the penis.

The massage roller 30 may be rotatable actively, for example, upon driven by an electric motor. Alternatively, the massage roller 30 may be rotatable passively. That is, the rotation of the massage roller 30 is not caused by electric driving, rather it rotates under friction or external force applied by the male penis.

Each massage roller rotates about a rotation axis P, the orientation of which is not particularly limited in the present disclosure. In the present embodiment, as shown in FIG. 3, the rotation axis P of each massage roller 30 is arranged substantially perpendicular to the axial direction of the support base 1. Alternatively, the rotation axis P of each massage roller 30 may be arranged at an angle relative to the axial direction of the support base 1. In case that the massage rollers 30 are rotatable upon driven by an electric motor, the rotation axis P of the massage roller 30 may be arranged parallel to the axial direction of the support base 1.

Preferably, the sex toy may include a second massage portion 20 arranged in the massage space 1*a*. The second massage portion 20 is arranged spaced from the first massage portion 10 in the axial direction. Preferably, the second massage portion 20 is located adjacent to a second axial end of the first massage portion 10.

Preferably, the sex toy may include a clamping mechanism 40 for adjusting a position of the massage roller 30. More preferably, the sex toy may include a drive mechanism 50 for driving the clamping mechanism 40 to move axially.

The at least one first roller 30 and the at least one second roller 30 of the first massage portion 10 are configured to massage a first part of the penis, particularly the middle portion of the penis. The second massage portion 20 is provided with a massage cavity 21 for accommodating and massaging a different second part of the penis, particularly the glans. The penis can be inserted through the entrance 12 into both the first massage portion 10 the second massage portion 20 one after another.

The clamping mechanism 40 is configured for driving the at least one first roller 30 and the at least one second roller 30 to move in a direction at an angle relative to the axial direction of the support base 1. The drive mechanism 50 is configured for driving the clamping mechanism 40 to move along the axial direction of the support base 1. The massage cavity 21 of the second massage portion 20 extends axially. The second massage portion 20 has a massage area formed at an inner periphery thereof surrounding the massage cavity 21 for massaging the penis inserted therein.

Figure 11:
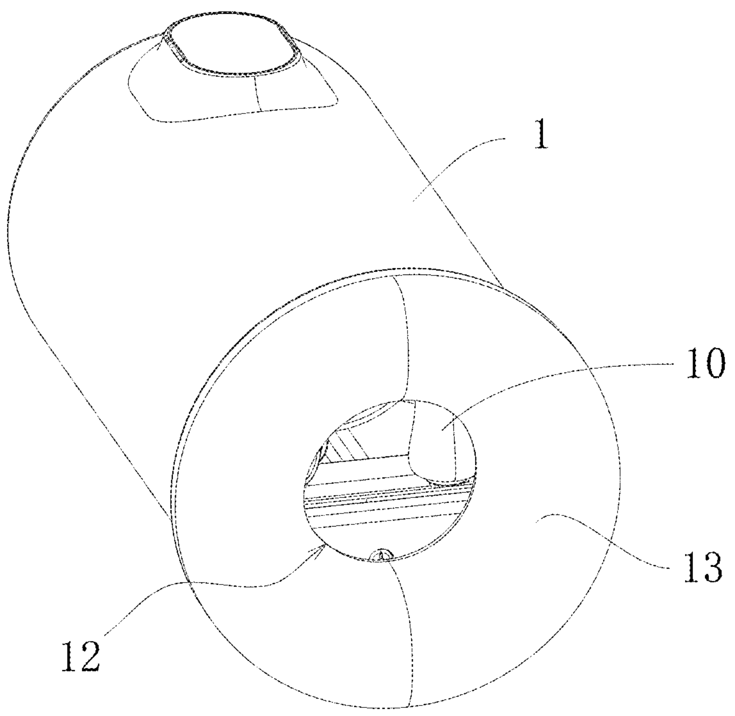
FIG. 11 is a schematic structural view of a sex toy according to yet another embodiment of the present disclosure.

In yet another embodiment, as shown in FIG. 11, the support base 1 is shaped as a hollow cylinder. The sex toy further includes an annular lip 13 surrounding the circumference of entrance 12. The lip 13 is made of a flexible material, which enhances contact area with the penis and provides an improved wrapping sensation. Therefore, the support base 1 serves as the supporting structure of the entire sex toy, providing a mounting foundation for other components, ensuring structural stability of the entire sex toy during operation.

In one embodiment, each massage roller 30 is mounted on the clamping mechanism 40, which in turn is connected to the drive mechanism 50. The drive mechanism 50 is mounted to the support base 1 and is configured to drive the clamping mechanism 40 to move along the axial direction of the support base 1. Simultaneously, the clamping mechanism 40 is connected to each massage roller 30 by its own mechanical structure, serving not only to support each massage roller 30 but also to achieve movement of each massage roller 30 along a lateral direction of the support base 1 when driven. The lateral direction is parallel to the plane which is perpendicular to the axial direction of the support base 1. The position and shape of the massage cavity 21 is designed according to physiological structure of the penis, for example, as shown in FIG. 3, both ends of the massage cavity 21 along the axial direction of the support base 1 are open. This design facilitates insertion of the penis into the massage cavity 21 to receive massage from the second massage portion 20. The second massage portion 20 may have a corresponding mounting structure, enabling the second massage portion 20 to securely mount to the support base 1 and locate at an optimal position for coordinated operation with the first massage portion 10.

Upon activation of the sex toy, the drive mechanism 50 is initially activated to drive the clamping mechanism 40 to move along the axial direction of the support base 1, which enables the at least one first roller 30 and the at least one second roller 30 to be positioned corresponding to an extended range in the axial direction, thereby applicable for different lengths of penises.

Simultaneously, the clamping mechanism 40 operates according to preset programming or user input, and the at least one first roller 30 and the at least one second roller 30 is stably driven by the clamping mechanism 40 to move along the lateral direction of the support base 1. Such radial movement can adjust the size of the gap 30*a* between the at least one first roller 30 and the at least one second roller 30 so as to adapt for different penises with different radial dimensions. Through precise controlling the movement of the clamping mechanism 40, the at least one first roller 30 and the at least one second roller 30 can be adjusted to an optimal location, thereby providing an appropriate initial massage position for provide improved contact with various parts of the penis.

When the at least one first roller 30 and the at least one second roller 30 reach the target position, the massage action begins. Preferably, each massage roller 30 may incorporate a vibration motor therein, which generates vibrational energy for massaging penis. Additionally, each massage roller 30 may achieve a reciprocate motion through a cam mechanism driven by a motor, thereby simulating manual kneading actions like that in the embodiment shown in FIG. 1*a* through 1*f*. There is also another massage manner that may alternatively be employed, including but not limited to electromagnetic actuation to generate pulsed massage motions.

With respect to the second massage portion 20, when the penis is inserted into the massage cavity 21, the second massage portion 20 can operate independent from the first massage portion 20. The second massage portion 20 may include elements disposed on the inner wall of the massage cavity 21 to provide the stimulation. The elements may include air bags, massage balls or the like, which operate through inflation, deflation, or rotational motion to provide massage for the penis within the massage cavity 21.

For example, when air bags are implemented, an air pump is employed to alternatively inflate and deflate the chambers of the air bags, whereby the expansion and contraction of the chambers generate cyclical compressive and decompressive massage effects on the penis. Alternatively, when massage balls are implemented, an electric motor may drive the balls to rotate or vibrate, thereby providing frictional stimulation on the penis.

Preferably, the second massage portion 20 is made of a flexible material, enabling a better fit for the contour of the penis, thereby enhancing the user comfort during massage. In addition, the second massage portion 20 may be driven by a driving element, which includes, but is not limited to, a vibration generator for driving the second massage portion 20 to vibrate, a rotational actuator for driving the second massage portion 20 to rotate, a linear actuator for driving the second massage portion 20 to reciprocate axially, or a vacuum system for creating negative pressure within the massage cavity 21 of the second massage portion 20.

In some embodiments, the sex toy of the present disclosure achieves multi-stimulation for the penis through the cooperation between the first massage portion 10 and the second massage portion 20, thereby providing a more diversified massage experience.

In some embodiments, the drive mechanism 50 and clamping mechanism 40 in the first massage portion 10 can flexibly adjust the position of the at least one first roller and 30 the at least one second roller 30, enabling the at least one first roller 30 and the at least one second roller 30 to move both axially and radially. This allows precise adjustment according to different users' penis length and thickness, improving the adaptability and personalization of the massage, expanding the applicable population range, and better satisfying the needs of different users.

In some embodiment, the at least one first roller 30 and the at least one second roller 30 can employ multiple massage modes, increasing the effectiveness of the massage. For example, through the combination of various massage modes such as vibration, kneading, and pulsation, the sexual stimulation effect can be further enhanced.

In some embodiment, the massage cavity 21 design of the second massage portion 20 can provide better positioning and fixation for the penis, improving the precision of the massage. Meanwhile, the internal massage mechanism of the second massage portion 20 can perform targeted massage according to different parts of the penis. The second massage portion 20 cooperates with the first massage portion 10, which forms a relatively complete penis massage system, making the massage more comprehensive and integrated, and further enhancing comfort and sexual stimulation effects.

Furthermore, the drive mechanism 50 is arranged to the axial direction of the support base 1, enabling the first massage portion 10 to move precisely along the axial direction, which can better adapt to the penises of different lengths, and ensure that the at least one first roller 30 and the at least one second roller 30 can cover the entire range of penis lengths for massaging. As a result, it greatly improves the applicability of the sex toy and meets the individual needs of different users.

In one embodiment, the support base 1 is provided with a partition 11. The second massage portion 20 and each massage roller 30 are arranged above the partition 11, and the drive mechanism 50 and clamping mechanism 40 are arranged below the partition 11. The partition 11 is provided with a groove 111 corresponding to each massage roller 30, for providing moving space for the massage rollers 30. Specifically, the partition 11 is fixed to the support base 1 and divides the massage space 1*a* of the support base 1 into an upper part and a lower part. The partition 11 may be connected to the support base 1 by welding, screwing, snapping, or other means to form a stable structure, providing support and positioning base for other components.

The second massage portion 20 is arranged above the partition 11 and may be connected directly to the partition 11 or via a support structure to ensure a stable position. For example, the bottom of the second massage portion 20 may be fixed to upper surface of the partition 11 through bolts or clamping slots to prevent displacement during use. The position of the second massage portion 20 is determined based on the actual requirements of the penis massaging, so as to facilitate the insertion of the penis into its massage cavity 21 for massage. The height and orientation of the second massage portion 20 on the support base 1 should match the comfortable position of the penis inserted, thereby ensuring massage effects and users experience.

The drive mechanism 50 and the clamping mechanism 40 are positioned below the partition 11, which not only facilitates the concealment and protection of internal transmission components but also utilizes the partition 11 as a support structure to optimize the overall space layout of the device.

The groove 111 on the partition 11 is located below each massage roller 30 and provides space for the movement of each massage roller 30. The shape and size of the groove 111 are designed according to the motion range and track of each massage roller 30, ensuring that each massage roller 30 does not interfere with the partition 11 during radial movement. The groove 111 may be rectangular, circular, or other shapes, and its position and size are precisely matched with the motion range of each massage roller 30 to ensure smooth movement of each massage roller 30 above the partition 11 during operation. In some embodiments, two grooves 111 may be provided for the two massage rollers 30 respectively. In some embodiments, the two grooves 111 can be integrated as one groove 111, that is, only one groove 111 may be provided for both the two massage rollers 30.

Figure 6:
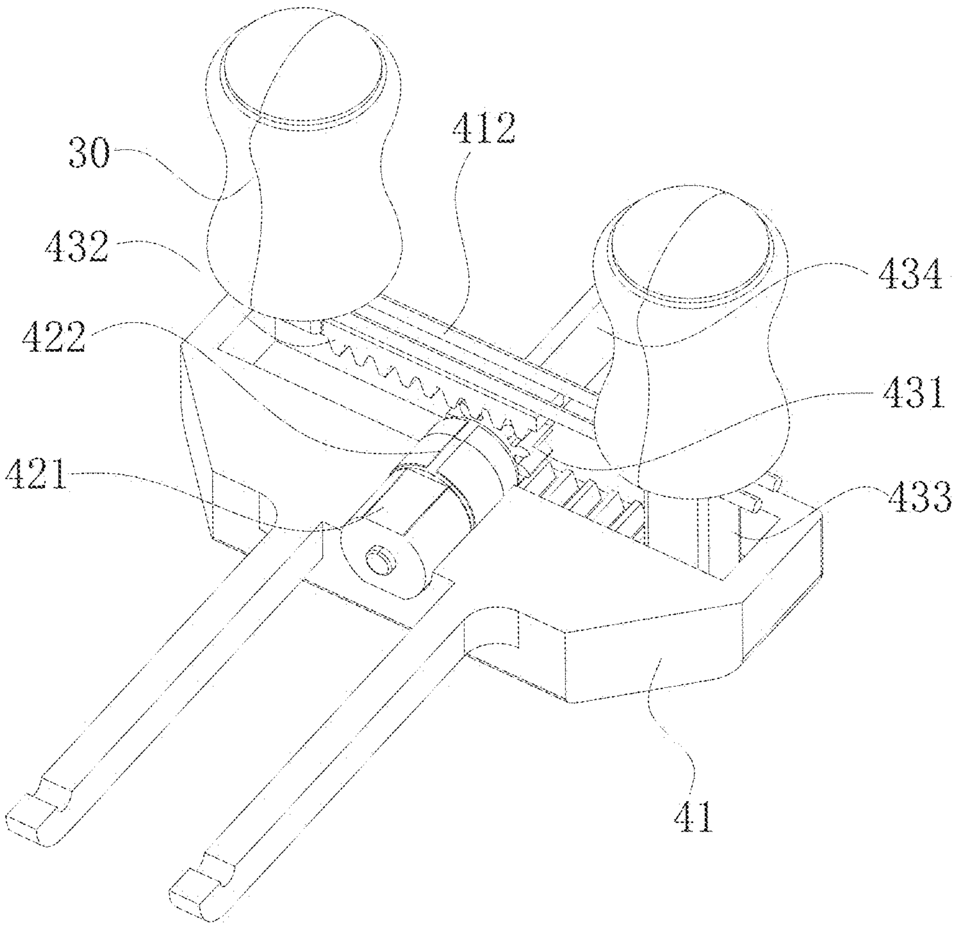
FIG. 6 is a structural schematic view of a clamping mechanism of the sex toy shown in FIG. 2.
Figure 7:
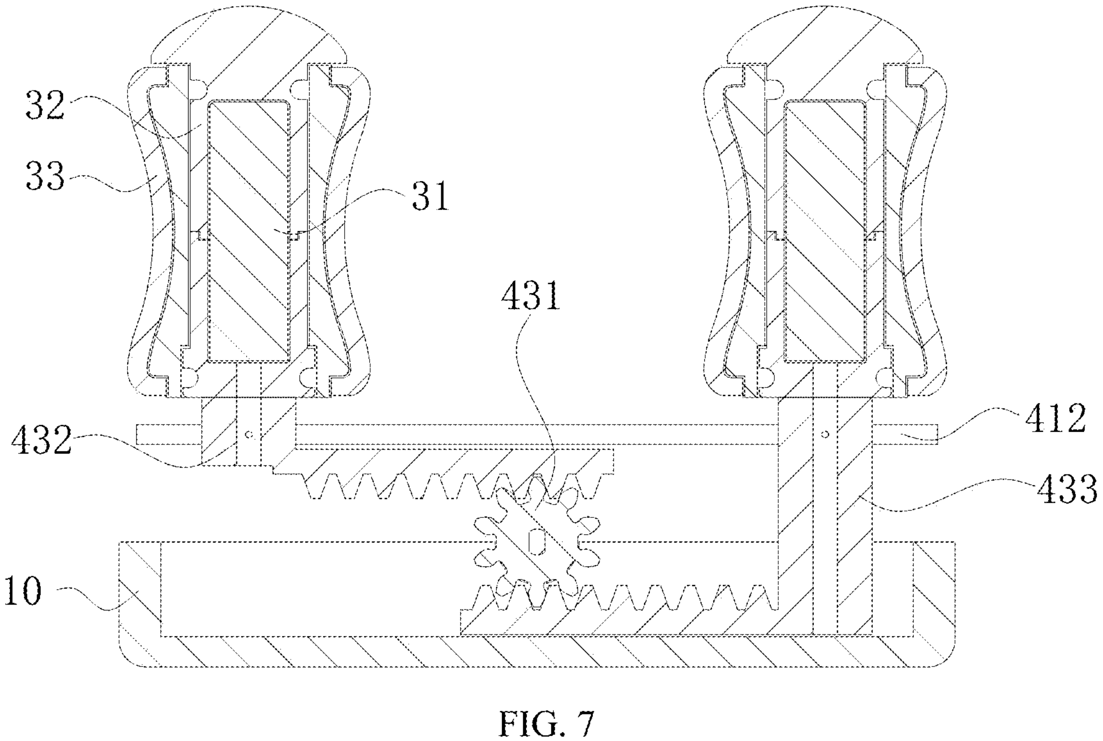
FIG. 7 is a sectional schematic view of the clamping mechanism of the sex toy shown in FIG. 2.
Figure 8:
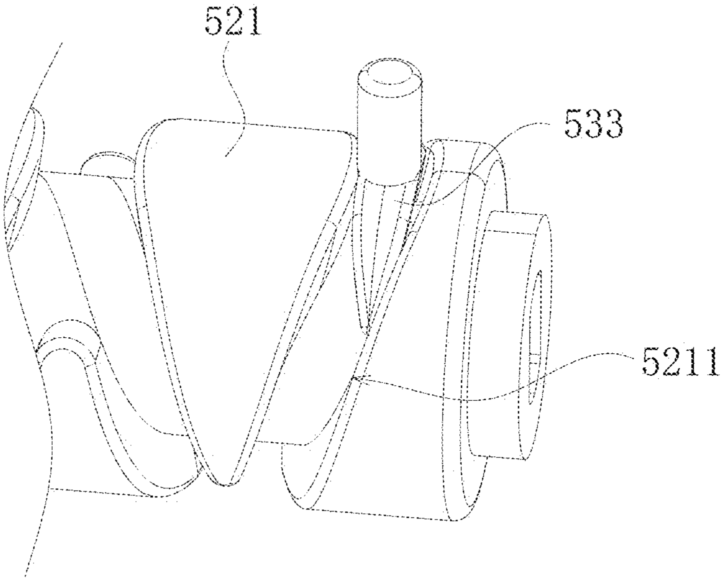
FIG. 8 is a structural schematic view illustrating a guiding portion confined within a lead screw of the sex toy shown in FIG. 2.
Figure 9:
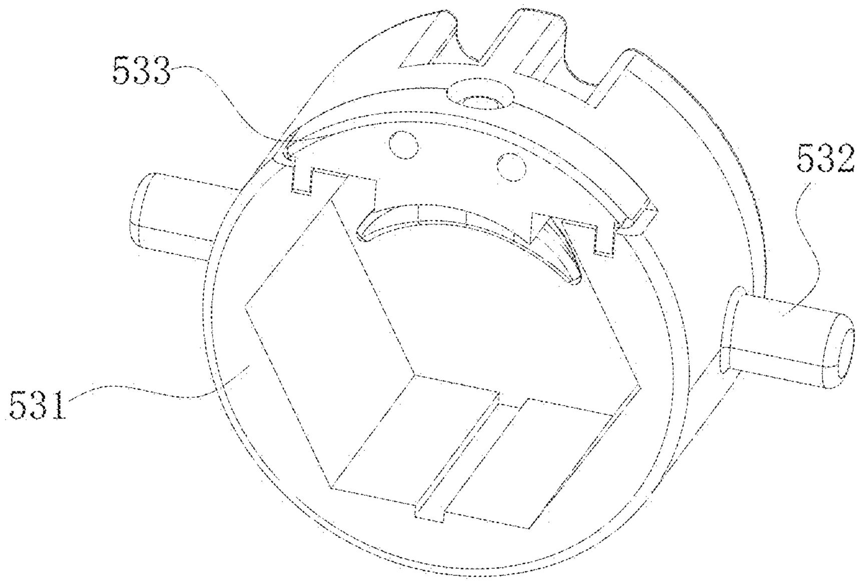
FIG. 9 is a structural schematic view of a slider of the sex toy shown in FIG. 2.
Figure 10:
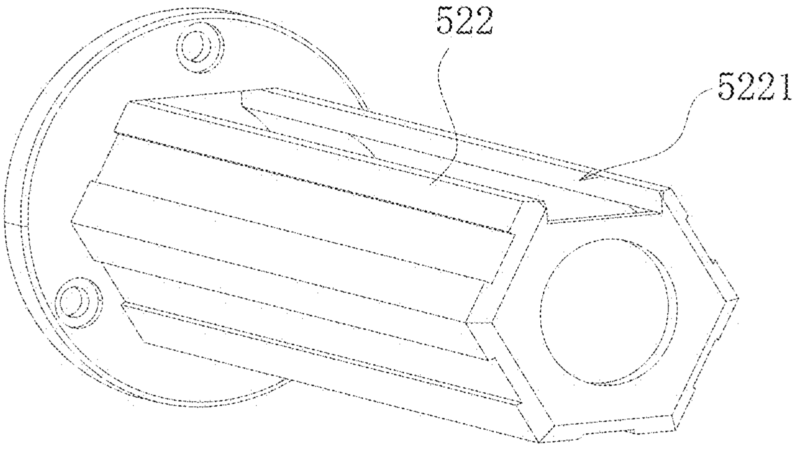
FIG. 10 is a structural schematic view of a sleeve of the sex toy shown in FIG. 2.

In the embodiment shown in FIGS. 6 and 7, each massage roller 30 is connected to and driven by a massage motor assembly 31. The massage motor assembly 31 is arranged at a moving end 401 of the clamping mechanism 40. The massage roller 30 is connected to the output end of the massage motor assembly 31.

The massage motor assembly 31 may be fixed on the moving end 401 of the clamping mechanism 40 via bolts, snaps, or other fastening means to prevent loosening or displacement during operation. The moving end 401 of the clamping mechanism 40 is configured to drive the massage motor assembly 31 to move in the lateral direction of the support base 1, thereby allowing the massage motor assembly 31 to adjust its position following the movement of the clamping mechanism 40 to meet the massage requirements for different parts of the penis.

In the embodiments in which the massage rollers 30 are rotatable actively, the massage motor assembly 31 includes a first motor 312. The massage roller 30 may be mounted around the output shaft of the first motor 312 in a rotation-proof manner. That is, relative rotation between the massage roller 30 and the output shaft of the first motor 312 is prevented, such that rotation of the output shaft of the first motor 312 will cause synchronous rotation of the massage roller 30.

In some embodiments, the massage roller 30 may be fixedly mounted to the output shaft of the first motor 312 by means of a key, a pin, or the like to ensure that the torque from the first motor 312 can be effectively transmitted to the massage roller 30. Alternatively, the massage roller 30 may be fixed to the output shaft through interference fit or form-fitting.

After being connected to the output end of the first motor 312, the massage roller 30 can rotate under the drive of the first motor 312, thereby achieving stimulation on the penis.

In some embodiments, the massage motor assembly 31 may include a vibration motor 311. The massage roller 30 can be connected to the vibrating part of the vibration motor 311. The vibrations generated by the vibration motor 311 are transmitted to the massage roller 30 through a specific connecting structure, causing it to generate corresponding vibration stimulation. When driven by the vibration motor 311, the massage roller 30 contacts the penis with high-frequency vibrations, stimulating the penis through the impact force and frequency variations of the vibrations.

Figure 13:
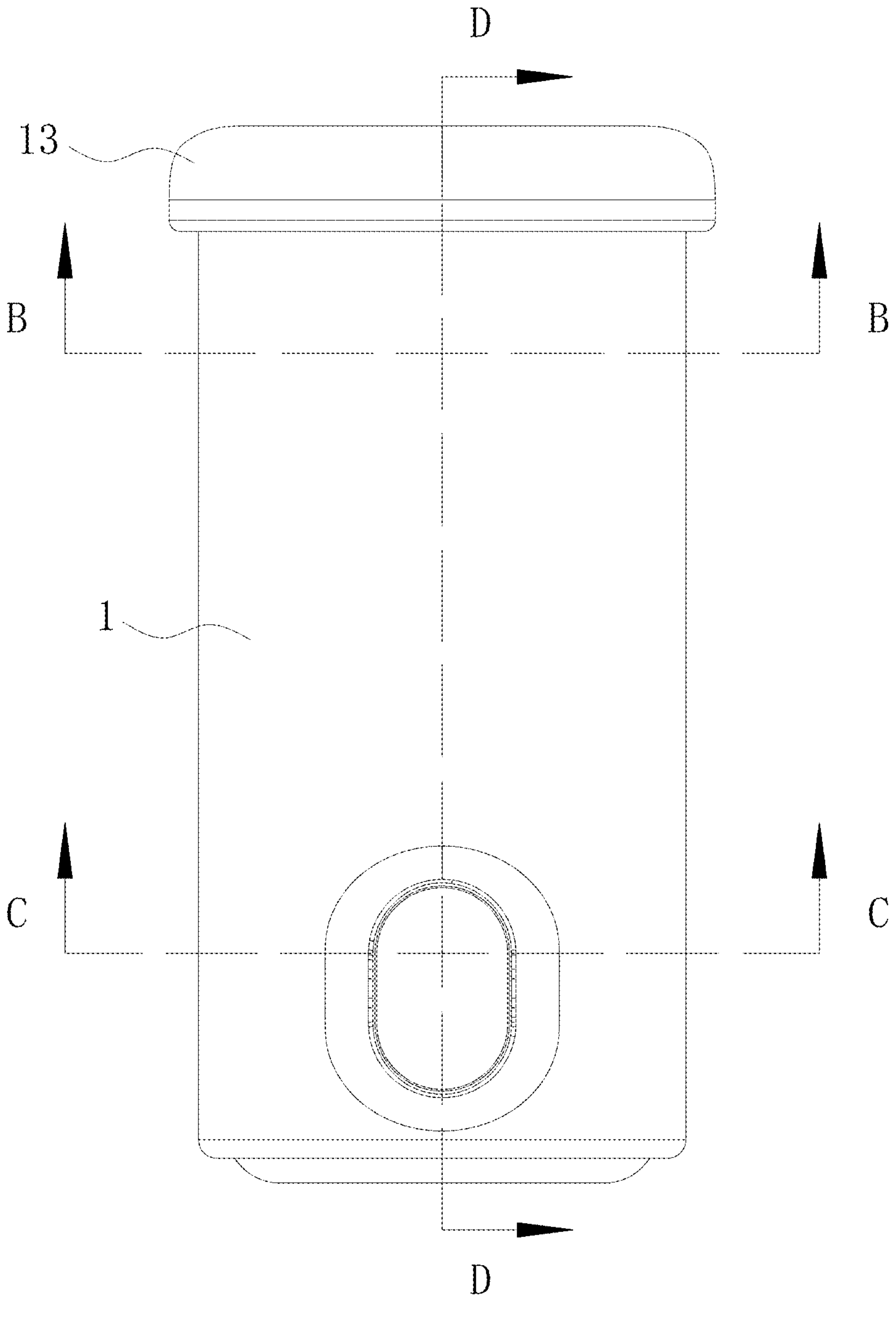
FIG. 13 is a schematic structural view of the sex toy shown in FIG. 11, viewed from yet another aspect.
Figure 14:
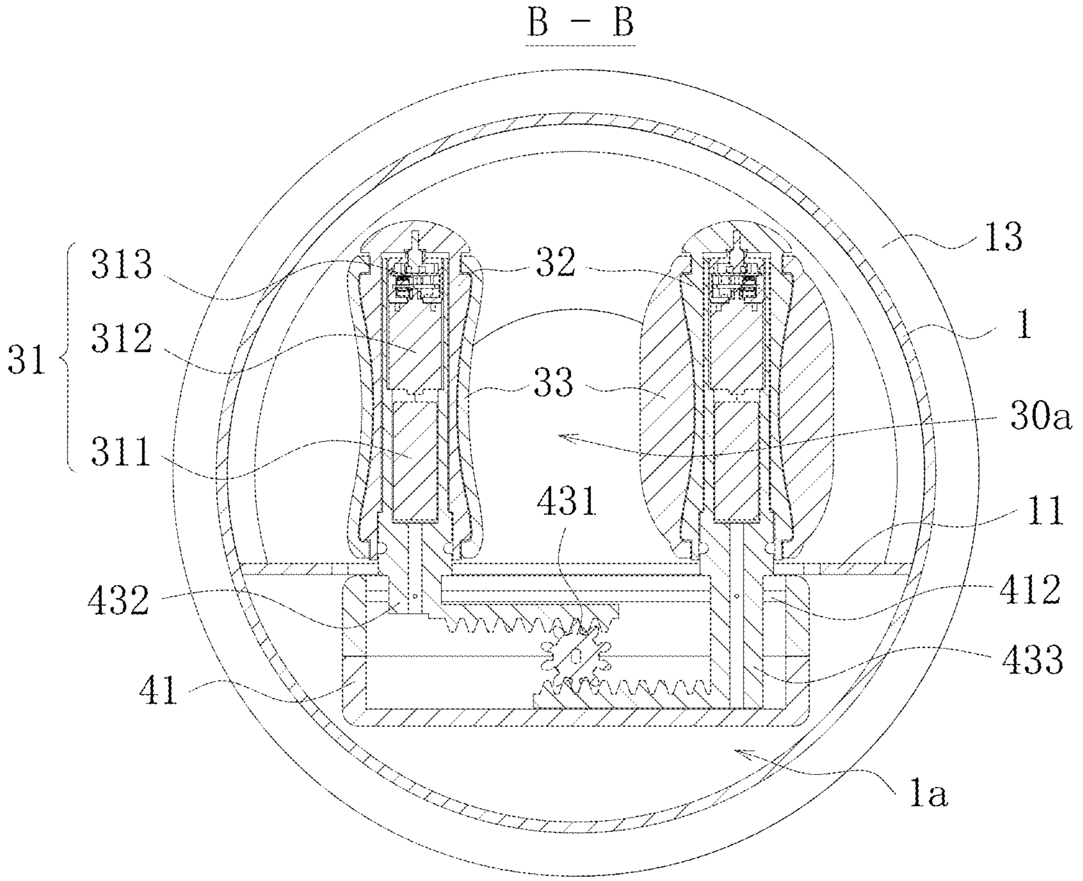
FIG. 14 is a sectional schematic view of the sex toy shown in FIG. 13, taken along line B-B.

In some embodiments, as shown in FIGS. 13 and 14, the massage motor assembly 31 includes a vibration motor 311, a first motor 312, and a first motor gearbox 313. The vibration motor 311, first motor 312, and first motor gearbox 313 are all located within the massage roller 30 and are arranged one after another along a direction away from the moving end 401. The first motor 312 drives the massage roller 30 to rotate through the first motor gearbox 313.

Figure 12:
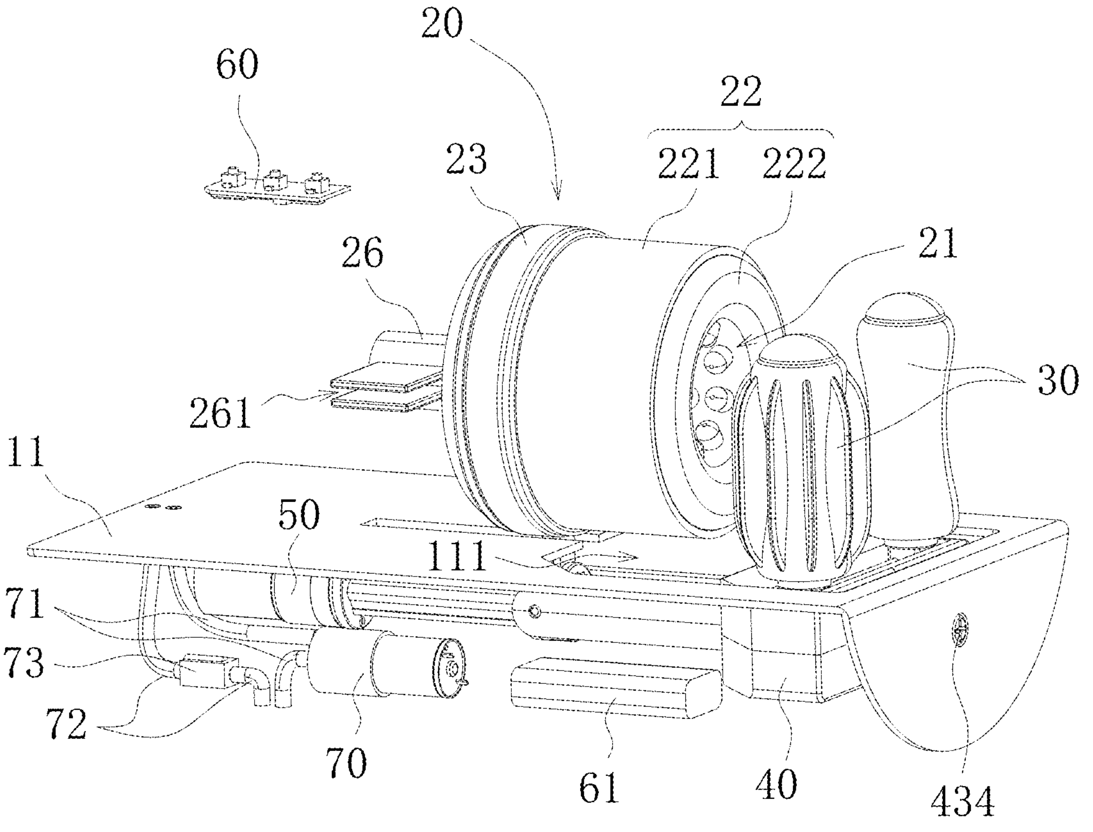
FIG. 12 is a schematic structural view of the sex toy shown in FIG. 11, viewed from another aspect, wherein the support base and lip is removed for clarity.

In some embodiments, each massage roller 30 may include a rigid rolling core 32, and a flexible layer 33. The flexible layer 33 is made of a flexible material and is wrapped over the rolling core 32. Specifically, by providing the flexible layer 33 on the surface of the rolling core 32, a soft contact is provided to the penis, which increases the comfort of the user and improves the user experience. In addition, the flexible layer 33 may be provided with protrusions or textures on its surface, which can increase friction and therefore enhance the stimulating effect. Specifically, in the embodiment shown in FIG. 12, the surface of the flexible layer 33 is provided with a plurality of ribs spaced apart along its rotational direction.

In some embodiments, the massage roller 30 is tubular. Preferably, a diameter of the massage roller 30 at a middle part is smaller than a diameter of the massage roller 30 at two end parts. During the massage process, the penis is contacted with the massage roller 30, which unique structure of a smaller middle diameter compared to the ends allows it to better conform to the contour of the penis, thereby increasing the contact area with the penis and improving the wrapping sensation. In one embodiment shown in FIGS. 6 and 7, the rolling core 32 contributes the varied diameter of the massage roller 30, and the flexible layer 33 has a constant thickness. It should be understood that, in other embodiments, it may be the flexible layer 33 that contributes the varied diameter of the massage roller 30, in which case the rolling core 32 may have a constant diameter.

In other embodiments, the massage roller 30 may alternatively be shaped as a sphere or ellipsoid, for example, as shown in FIG. 11.

In this embodiment, as shown in FIGS. 4 to 7, the clamping mechanism 40 is located at one side of the support base 1. The clamping mechanism 40 includes a base plate 41, a clamping actuator 42, and a first transmission assembly 43. The base plate 41 serves as the foundation for carrying the clamping mechanism 40. Specifically, the base plate 41 carries both the clamping actuator 42 and the first transmission assembly 43. The clamping actuator 42 is arranged on the base plate 41. The first transmission assembly 43 connects an output end of the clamping actuator 42 to the at least one first roller 30 and the at least one second roller 30. The at least one first roller 30 and the at least one second roller 30 are able to move along a lateral direction of the support base 1 by the clamping actuator 42 and the first transmission assembly 43.

The clamping mechanism 40 drives at least two massage rollers 30 to move along the lateral direction of the support base 1 through the clamping actuator 42 and the first transmission assembly 43, thereby adjust the gap 30*a* between the massage rollers 30.

The drive mechanism 50 is arranged along the axial direction of the support base 1 and drives the entire clamping mechanism 40 to move axially. The drive mechanism 50 has a moving end 501 connected to the base plate 41. The moving end 501 of the drive mechanism 50 serves as a torque output end that drives the base plate 41 and other components mounted thereon to move together. This allows the entire clamping mechanism 40 to adjust its position in the axial direction to accommodate different lengths of the penises and meet various massage requirements.

Under the action of the clamping mechanism 40 and the drive mechanism 50, the positions of the massage rollers 30 can be adjusted radially and axially to achieve precise massage on different parts of the penis.

Specifically, the clamping actuator 42 includes a second motor 421 and a second motor gearbox 422. Both the second motor 421 and the second motor gearbox 422 are mounted on the base plate 41. The second motor gearbox 422 is connected to both the second motor 421 and the first transmission assembly 43.

In particular, both the second motor 421 and the second motor gearbox 422 may be mounted on the base plate 41 via bolts to prevent loosening or displacement during operation of the sex toy. One end of the second motor gearbox 422 is connected to the output shaft of the second motor 421, preferably through a coupling to ensure coaxial alignment and efficient torque transmission. The other end of the second motor gearbox 422 is connected to the first transmission assembly 43 and transmits the torque to the first transmission assembly 43 through transmission components such as gears, chains, belts or the like. This configuration enables the second motor gearbox 422 to regulate speed and torque between the second motor 421 and the first transmission assembly 43, meeting various movement requirements of at least two massage rollers 30.

The base plate 41 is connected to the moving end 501 of the drive mechanism 50, allowing the base plate 41 to move axially along the support base 1 when driven by the drive mechanism 50. Therefore, the at least one first roller 30 and the at least one second roller 30 disposed on the base plate 41 and connected to the first transmission assembly 43 can achieve both axial movement and radial horizontal movement along the support base 1 when driven by the clamping actuator 42 and the drive mechanism 50.

In one embodiment, the at least one first roller 30 and the at least one second roller 30 includes two massage rollers 30. The clamping mechanism 40 is configured to drive the two massage rollers 30 to perform sliding movements towards or away from each other along a direction at an angle to the axial direction.

Furthermore, the first transmission assembly 43 includes a gear 431, a first rack 432, and a second rack 433. The gear 431 is connected to an output end of the clamping actuator 42, the first rack 432 and the second rack 433 are respectively arranged opposite each other along a vertical direction of the support base 1 and both are meshed with the gear 431, each of the first rack 432 and the second rack 433 is arranged with one massage roller 30. Specifically, the gear 431 is tightly connected to the output end of the clamping actuator 42 through a key connection or coupling connection, ensuring stable and efficient torque transmission to the gear 431.

The clamping actuator 42 is fixed on the base plate 41, and the gear 431 is connected to the output end of the clamping actuator 42. The first rack 432 and the second rack 433 are arranged in parallel, positioned respectively on upper and lower sides of the gear 431 and maintained in meshing engagement therewith. Meanwhile, the two massage rollers 30 respectively located on the first rack 432 and the second rack 433 can perform sliding movements towards or away from each other along the lateral direction of the support base 1 under the driving of the gear 431. By cooperating with the second massage portion 20, they can achieve comprehensive massage for the penis.

Furthermore, an extension rod 434 is provided on a side of the gear 431 opposite to the clamping actuator 42. One end of the extension rod 434 sequentially passing through the base plate 41 and the support base 1. Specifically, the distance, i.e., the gap 30*a*, between the two massage rollers 30 can be manually adjusted via the extension rod 434.

Furthermore, the base plate 41 is further provided with a sliding slot 411. A guide rail 412 is horizontally arranged in the sliding slot 411. One end of each massage roller 30 extends into the sliding slot 411 and is slidably connected to the guide rail 412. Specifically, each massage roller 30 can move within the area of the sliding slot 411 of the base plate 41 through the sliding connection with the guide rail 412. The guide rail 412 provides precise guidance for the movement of each massage roller 30, ensuring each massage roller 30 can accurately move along the lateral direction of the support base 1 to achieve precise positioning and massage for different parts of the penis.

In this embodiment, as shown in FIGS. 4 to 5, and 8 to 10, the drive mechanism 50 includes a drive assembly 51, a second transmission assembly 52, and a slider 53. The output end of the drive assembly 51 is connected to the second transmission assembly 52. The slider 53 is connected to the second transmission assembly 52 and can be driven to move horizontally along the axial direction of the support base 1.

Specifically, the second transmission assembly 52 is connected between the drive assembly 51 and the slider 53, serving to transmit and convert torque. The slider 53, served as the moving end 501 of the drive mechanism 50, is connected to the base plate 41. The clamping mechanism 40 mounted on the base plate 41 moves in the axial direction of the support base 1 along with the movement of the slider 53. Preferably, the drive mechanism 50 is configured to drive the clamping mechanism 40 to perform reciprocate motion along the axial direction. The second massage portion 20 is disposed to the support base 1 and cooperates with the first massage portion 10 to perform massage for the penis.

Furthermore, the drive assembly 51 includes a third motor 511 and a third motor gearbox 512. Both the third motor 511 and the third motor gearbox 512 are arranged to the support base 1. The third motor gearbox 512 is connected to the third motor 511 and the second transmission assembly 52. Specifically, one end of the third motor gearbox 512 is connected to the output shaft of the third motor 511, preferably through a coupling to ensure coaxial alignment and efficient torque transmission. The other end of the third motor gearbox 512 is connected to the second transmission assembly 43 and transmits the torque output by the third motor gearbox 512 to the second transmission assembly 52.

Furthermore, the second transmission assembly 52 includes a lead screw 521 and a sleeve 522. The lead screw 521 is arranged inside the sleeve 522 and is rotatable relative to the sleeve 522. The sleeve 522 is provided with an elongated groove 5221 extending in the axial direction of the support base 1. The elongated groove 5221 penetrates the wall of the sleeve 522 at one side to expose the lead screw 521. The lead screw 521 is connected to an output end of the drive assembly 51 and is rotatable under driving of the drive assembly 51. One end of the slider 53 extends through the elongated groove 5221 of the sleeve 522 and engaged with a threaded groove 5211 of the lead screw 521. When the lead screw 521 rotates, the slider 53 engaged with the threaded groove 5211 is driven by the lead screw 521. Due to the restriction of the elongated groove 5221 of the sleeve 522, the slider 53 will slide along the elongated groove 5221 of the sleeve 522.

Preferably, the lead screw 521 is disposed within the sleeve 522 with a certain clearance, which ensures that the lead screw 521 can rotate freely within the sleeve 522. The clearance engagement between the slider 53 and the sleeve 522 not only allows axial movement of the slider 53 relative to the sleeve 522 but also prevents excessive wobbling during motion.

One end of the slider 53 is engaged the threaded groove 5211 of the lead screw 521, which achieves a threaded transmission between them. Simultaneously, the slider 53 is also constrained and guided by the elongate groove 5221 during movement. The lead screw 521 and the sleeve 522 employed by the second transmission assembly 52 enables the slider 53 to move precisely, thereby achieving more accurate positional adjustment for each massage roller 30 along the axial direction of the support base 1. This precise control capability achieves accurate massage operation for penises with the different lengths, meeting personalized needs for various users. The structure of the second transmission assembly 52 is relatively compact. The arrangement of the lead screw 521 positioned inside the sleeve 522 and the slider 52 disposed outside the sleeve 522, optimizes space utilization and reduces the volume of the sex toy. Moreover, the connection manners between components are simple and convenient to assemble and disassemble, so that the lead screw 521, the sleeve 522 and the slider 53 can be easily inspected, cleaned and replaced, reducing difficulty and cost during maintenance.

Furthermore, the slider 53 includes a sliding portion 531, a connecting portion 532, and a guiding portion 533. One end of the connecting portion 532 is connected to the sliding portion 531. The other end of the connecting portion 532 is connected to the clamping mechanism 40. The sliding portion 531 is mounted around the sleeve 522. The guiding portion 533 extends from the sliding portion 531. The free end of the guiding portion 533 away from the sliding portion 531 passes through the elongate groove 5221 and is engaged with the threaded groove 5211. Specifically, one end of the connecting portion 532 is fixedly connected to the sliding portion 531, the other end is connected to the base plate 41 of the clamping mechanism 40, which ensures a stable torque transmission from the drive mechanism 50 to the clamping mechanism 40.

Specifically, the free end of the guiding portion 533 passes through the elongate groove 5221 and slidably engages with the threaded groove 5211, thus converting rotation of the lead screw 521 into linear movement of the guiding portion 533 along the elongated groove 5221. Therefore, the sliding portion 531 and the connecting portion 532 connected to the guiding portion 533 slide with the guiding portions 533 along the extension direction of the elongated groove 5221, so as to drive the clamping mechanism 40 move linearly. The sliding portion 531 is mounted around the sleeve 522 with a clearance therebetween, ensuring a smooth axial movement relative to the sleeve 522 while restricting radial wobbling, thus ensuring the sliding stability of the slider 53.

The guiding portion 533 passes through the elongate groove 5221 and slidably engages with the threaded groove 5211, which achieves a threaded transmission between the slider 53 and the lead screw 521. Meanwhile, the elongate groove 5221 serves as a guide for the guide portion 533, ensuring that the slider 53 can only move in the axial direction of the sleeve 522. That is, when the lead screw 521 rotates, the elongate groove 5221 of the sleeve 522 restricts the guiding portion 533 from following the rotation of the lead screw 521, and the rotation of the lead screw 521 will drive the guiding portion 533 to slide within the threaded groove 5211, and the guiding portion 533 in turn drive the slider 53 to move in the axial direction along the lead screw 521, thereby transmitting the rotational movement of the lead screw 521 into the linear movement of the slider 53. By controlling the operation of the drive assembly 51, the rotation speed and direction of the lead screw 521 can be adjusted, thereby precisely controlling the movement speed and direction of the slider 53 for accurate adjusting the position of each massage roller 30.

Furthermore, the free end of the guiding portion 533 extending into the threaded groove 5211 is configured with an arc-shaped contour. Specifically, such arc-shaped contour conforming the contour of a segment of the threaded groove 5211 allows for optimal engagement with the threaded groove 5211 of the lead screw 521. That is, the crucial transmission connection between the guiding portion 533 and lead screw 521 is achieved by the insertion of the arc-shaped contour into the threaded groove 5211. The arc-shaped contour is able to slide smoothly within the threaded groove 5211 and effectively converts the rotation of the lead screw 521 into the linear movement of the guiding portion 533, which causes the linear movement of entire slider 53. The optimal engagement between the arc-shaped contour and the threaded groove 5211 reduces friction and jamming during transmission, ensuring a smooth torque transmission, thereby extending the service life of both the guiding portion 533 and the lead screw 521. Additionally, the stable operation of movement reduces damage risks to relative components, improving the operational reliability of the sex toy.

Furthermore, an outer periphery of the sleeve 522 in the radial cross section is configured in a polygon shape. An inner periphery of the sliding portion 531 in the radial cross section is also configured in a polygon shape corresponding to the polygon shape of the outer periphery of the sleeve 522. Preferably, the polygon shapes are hexagonal shapes. The polygon shape of the cross-section of the sleeve 522 and the corresponding polygon shape of the cross-section of the sliding portion 531 form form-fitting and has a better guiding and restricting effect on the sliding portion 531, enhancing the stability and accuracy of the movement of the slider 53.

In one embodiment, the second massage portion 20 is connected to a drive mechanism 50, and the drive mechanism 50 is configured to drive the second massage portion 20 to move along the axial direction of the support base 1.

Preferably, as shown in FIGS. 12, 13, 15, and 16, in yet another embodiment, the second massage portion 20 is connected to the drive mechanism 50 too. The drive mechanism 50 drives both the second massage portion 20 and the first massage portion 10 to move synchronously along the axial direction of the support base 1. Specifically, the second massage portion 20 is connected to the slider 53, which is positioned at the moving end 501 of the drive mechanism 50. That is, the slider 53 is connected to both the base plate 41 and the second massage portion 20, and the at least one first roller 30 and the at least one second roller 30 are mounted on the base plate 41. When the slider 53 moves along the axial direction of the support base 1, the second massage portion 20 and the at least one first roller 30 and the at least one second roller 30 will follow the slider 53 to move along the axial direction of the support base 1 synchronously.

Figure 16:
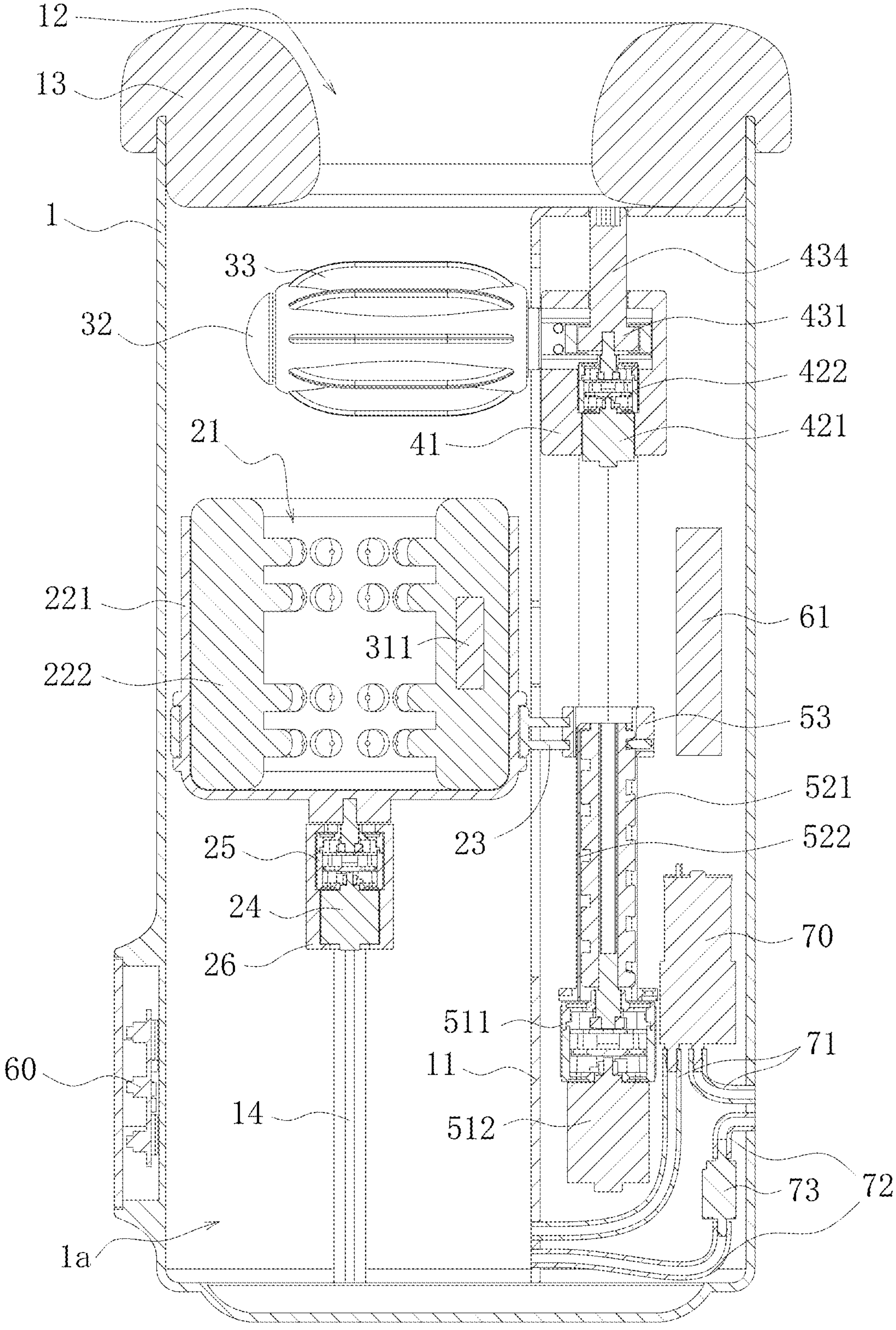
FIG. 16 is a sectional schematic view of the sex toy shown in FIG. 13, taken along line D-D.

In the yet another embodiment, as shown in FIGS. 13 and 16, the second massage portion 20 includes a massage cylinder 22 with the massage cavity 21 and a mounting ring 23 connected to the drive mechanism 50. The massage cylinder 22 is rotatably received within the mounting ring 23, and the massage cylinder 22 is rotatable about an axis parallel to the axial direction of the support base 1. Specifically, the slider 53 is connected to the radial outer side of the mounting ring 23, and the massage cylinder 22 is slidably received in the radial inner side of the mounting ring 23. When the penis is inserted into the rotatable massage cylinder 22, the massage cylinder 22 rotates relative to the outer periphery of the penis, thereby further enhancing the stimulation effect. In other embodiments, the second massage portion 20 may be merely rotatably mounted to the support base 1 without moving relative to the support base 1 along its axial direction.

More specifically, the second massage portion 20 further includes a fourth motor 24 and a fourth motor gearbox 25. Input end of the fourth motor gearbox 25 is connected to the fourth motor 24 along the axial direction of the support base 1, and the output end of the fourth motor gearbox 25 is connected to the massage cylinder 22 at an end away from the at least one first roller 30 and the at least one second roller 30.

In the yet another embodiment, as shown in FIGS. 13 and 16, the second massage portion 20 further includes a fixing member 26. Both the fourth motor 24 and the fourth motor gearbox 25 are disposed within the fixing member 26, and the fixing member 26 is slidably engaged with the support base 1. Specifically, the support base 1 further includes a plate 14 facing the fixing member 26 and extending along the axial direction of the support base 1. The outer periphery of the fixing member 26 is provided with an elongated slot 261 that is slidably engaged with the plate 14. The sliding engagement between the plate 14 and the elongated slot 261 facilitates smoother axial horizontal movement of the second massage portion 20 along the support base 1. Optionally, in other embodiments, the positions of the plate 14 and the elongated slot 261 may be exchanged, that is, the fixing member 26 may be provided with the plate 14, while the support base 1 is correspondingly provided with the elongated slot 261, and the two components are slidably engaged with each other.

In the yet another embodiment, as shown in FIGS. 13 and 16, the massage cylinder 22 includes a rigid cylinder body 221 slidably engaged with the radial inner side of the mounting ring 23, and a flexible cylinder body 222 engaged with the inner side of the rigid cylinder body 221. The radial inner side of the flexible cylinder body 222 defines the massage cavity 21. One end of the rigid cylinder body 221 along the axial direction of the support base 1 away from the at least one first roller 30 and the at least one second roller 30 is closed and is in torque transmission connection with the rotation motor gearbox 25.

In the yet another embodiment, as shown in FIGS. 13 and 16, the surface of the massage cavity 21 is further provided with protrusions, particularly on the radial inner side of the flexible cylinder body 222. The uneven surface thereby alters tactile contact with the penis, enhancing stimulation effectiveness.

In the yet another embodiment, as shown in FIG. 16, the massage cylinder 22 is additionally provided with a vibration motor 311, preferably disposed within the flexible cylinder body 222, to further improve stimulation effectiveness.

In the yet another embodiment, as shown in FIGS. 13 and 16, the sex toy further includes a negative pressure generator 70 disposed within the support base 1 and configured to change air pressure in the support base 1.

Specifically, the negative pressure generator 70 is positioned below the partition 11. The sex toy further includes a first pipeline 71, where one end of the first pipeline 71 is in communication with a space above the partition plate 11, the other end of the first pipeline 71 is in communication with an exterior of the support base 1, and the negative pressure generator 70 is connected to the first pipeline 71 and in communication with the air passage in the first pipeline 71. When the negative pressure generator 70 is activated, it extracts air directly from the part above the partition 11 through the first pipeline 71 and discharges it to the exterior of the support base 1. The pressure difference causes blood vessels in the penis to expand, increasing blood flow and enhancing stimulation.

In the yet another embodiment, as shown in FIGS. 13 and 16, the sex toy further includes a second pipeline 72 and a valve 73 mounted in the air passage of the second pipeline 72 to open or close the passage of the second pipeline 72. Specifically, one end of the second pipeline 72 communicates with the space above the partition 11, while the other end the second pipeline 72 communicates with the exterior of the support base 1. The valve 73 has an open state and a closed state. During use, the valve 73 remains closed while the negative pressure generator 70 operates to extract gas from above the partition 11, gradually reducing the internal pressure of the support base 1. After use, the negative pressure generator 70 stops, and the valve 73 switches to the open state, allowing external gas to rapidly flow into the support base 1 through the second pipeline 72, so as to quickly equalize the internal pressure with the external pressure, facilitating withdrawal of the penis through the entrance 12. The valve 73 can be switched either electrically or manually.

Figure 15:
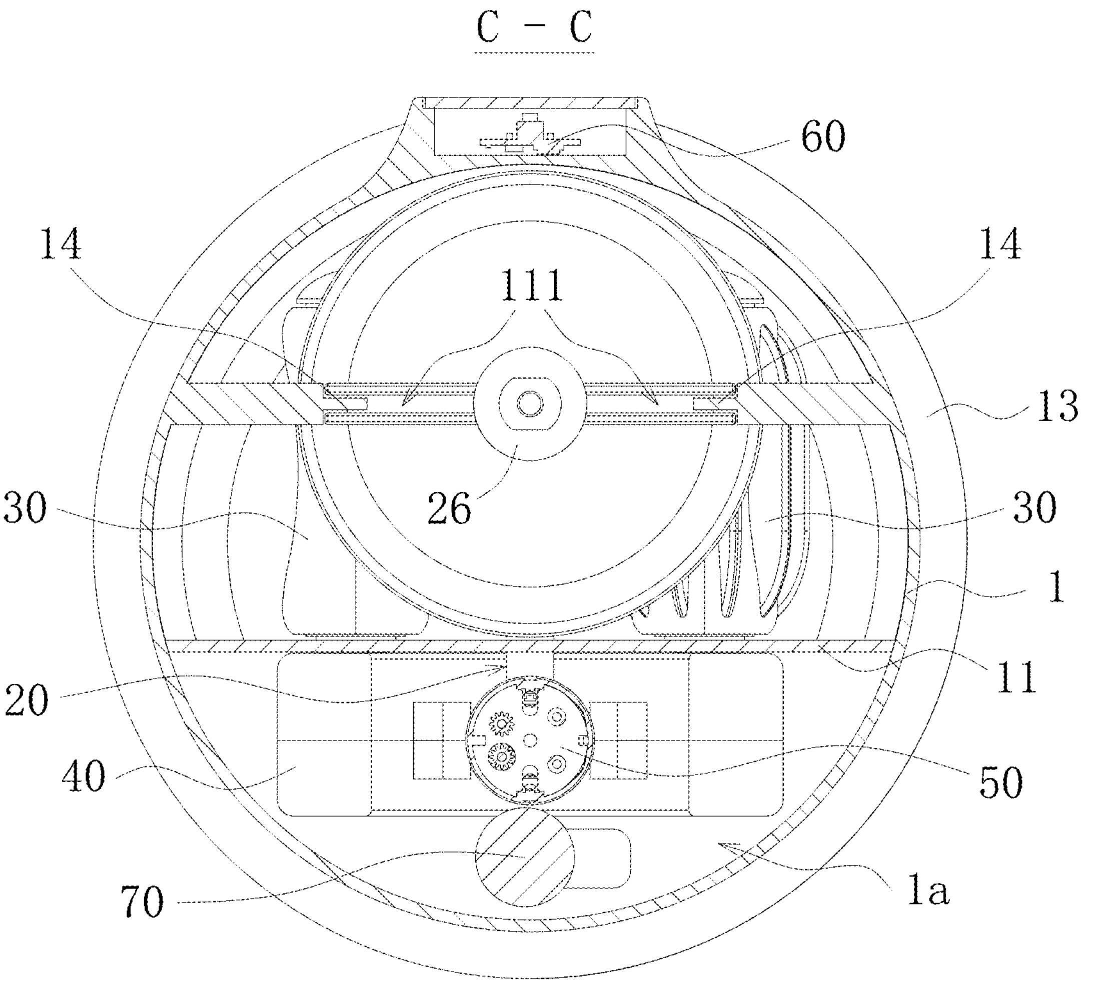
FIG. 15 is a sectional schematic view of the sex toy shown in FIG. 13, taken along line C-C.

In the yet another embodiment, as shown in FIGS. 13, 15, and 16, the sex toy further includes a circuit board 60 configured to control electrical components of the sex toy. Specifically, the circuit board 60 is electrically connected to the vibration motor 311, first motor 312, second motor 421, third motor 511, and/or rotation motor 24. The support base 1 is provided with control buttons that allow users to operate the circuit board 60 to control the third motor 511, second motor 421, and first motor 312, including starting, stopping, and speed adjustment, as well as to control the vibration motor 311, including starting, stopping, and vibration frequency.

In the yet another embodiment, as shown in FIGS. 13 and 16, the sex toy also includes a battery 61 for power supply, which is electrically connected to the circuit board 60. The battery 61 may be detachable for user replacement or fixed within the support base 1 as a rechargeable battery.

Finally, it should be noted that the above descriptions pertain only to the preferred embodiments of the present disclosure and should not be construed as limiting the protection scope of the present disclosure. While the present disclosure has been detailed with reference to the aforementioned embodiments, it will be apparent to those skilled in the art that modifications can be made to the technical solutions described, or some technical features can be equivalently replaced. Any modifications, equivalent replacements, or improvements made within the spirit and principles of the present disclosure should fall within its scope of protection.

What is claimed is:

1. A sex toy, comprising:

a support base; and a first massage portion mounted to the support base, wherein the first massage portion comprises at least one first massage roller and at least one second massage roller that are arranged opposite to each other, and a gap is defined between the at least one first roller and the at least one second roller for accommodating a male penis, wherein the at least one first massage roller and the at least one second roller are rotatable to stimulate two opposite sides of the male penis;

wherein the sex toy further comprises a second massage portion mounted to the support base, the second massage portion is arranged spaced from the first massage portion in an axial direction of the support base, the at least one first roller and the at least one second roller of the first massage portion are configured to stimulate a first part of the penis, the second massage portion is used for accommodating and stimulating a second part of the penis; and wherein the second massage portion is connected to a drive mechanism, and the drive mechanism is configured to drive the second massage portion to move along the axial direction of the support base.

2. The sex toy according to claim 1, wherein a rotation axis of each massage roller is parallel to the axial direction of the support base.

3. The sex toy according to claim 1, wherein the each massage roller is actively rotatable and is driven by a massage motor assembly.

4. The sex toy according to claim 1, wherein each massage roller is passively rotatable and is driven by friction or external force applied by the male penis inserted in the gap.

5. The sex toy according to claim 1, wherein each massage roller comprises a rigid rolling core and a flexible layer wrapped over the rigid rolling core, and the flexible layer is made of a flexible material.

6. The sex toy according to claim 1, wherein each massage roller is tubular with a diameter varied in an axial direction thereof.

7. The sex toy according to claim 6, wherein the diameter of each massage roller at a middle part is smaller than a diameter of the massage roller at two axial end parts.

8. The sex toy according to claim 1, further comprising a clamping mechanism for driving the at least one first roller and the at least one second roller to move along a direction at an angle to the axial direction of the support base, to adjust a size of the gap between the at least one first roller and the at least one second roller.

9. The sex toy according to claim 8, wherein the clamping mechanism comprises a base plate, a clamping actuator, and a first transmission assembly; both the clamping actuator and the first transmission assembly are arranged on the base plate, the first transmission assembly is in torque transmission connection with the clamping actuator and the at least one first roller and the at least one second roller; and wherein in use, the at least one first roller and the at least one second roller move along a lateral direction of the support base driven by the clamping actuator and the first transmission assembly.

10. The sex toy according to claim 8, wherein the drive mechanism is configured for driving the clamping mechanism to move along the axial direction of the support base.

11. The sex toy according to claim 10, wherein the drive mechanism comprises a drive assembly, a second transmission assembly, and a slider, the second transmission assembly connects the drive assembly to the slider, the slider is connected to the clamping mechanism; and wherein in use, the slider driven by the drive assembly and the second transmission assembly moves along the axial direction of the support base to move the at least one first roller and the at least one second roller axially.

12. The sex toy according to claim 1, wherein the drive mechanism is configured to drive the second massage portion and the at least one first roller and the at least one second roller to move synchronously along the axial direction of the support base.

13. The sex toy according to claim 12, wherein the second massage portion comprises a massage cylinder defining a massage cavity and a mounting ring connected to the drive mechanism, the massage cylinder is rotatably received within the mounting ring, and the massage cylinder is rotatable about an axis parallel to the axial direction of the support base.

14. The sex toy according to claim 1, wherein the second massage portion comprises a massage cylinder defining a massage cavity and a mounting ring, the massage cylinder is rotatably received within the mounting ring, and the massage cylinder is rotatable about an axis parallel to the axial direction of the support base.

15. The sex toy according to claim 1, further comprising a negative pressure generator arranged in a massage space defined by the support base for changing air pressure in the support base.

16. The sex toy according to claim 15, further comprising a first pipeline, wherein one end of the first pipeline is in communication with the massage space, an other end of the first pipeline is in communication with an exterior of the support base, the negative pressure generator is connected to the first pipeline and in communication with an air passage of the first pipeline.

17. The sex toy according to claim 16, further comprising a second pipeline and a valve mounted on in an air passage of the second pipeline, wherein one end of the second pipeline is in communication with the massage space, an other end of the second pipeline is in communication with an exterior of the support base, the valve is configured to allow or block air flow through the second pipeline.

18. A sex toy, comprising:

a support base; and a first massage portion mounted to the support base;

wherein the first massage portion comprises at least one first massage roller and at least one second massage roller that are arranged opposite to each other, and a gap is defined between the at least one first roller and the at least one second roller for accommodating a male penis;

wherein the at least one first massage roller and the at least one second roller are rotatable to stimulate two opposite sides of the male penis;

wherein the sex toy further comprises a second massage portion mounted to the support base, the second massage portion is arranged spaced from the first massage portion in an axial direction of the support base, the at least one first roller and the at least one second roller of the first massage portion are configured to stimulate a first part of the penis, the second massage portion is used for accommodating and stimulating a second part of the penis; and wherein the second massage portion comprises a massage cylinder defining a massage cavity and a mounting ring, the massage cylinder is rotatably received within the mounting ring, and the massage cylinder is rotatable about an axis parallel to the axial direction of the support base.

19. A sex toy, comprising:

a support base; and a first massage portion mounted to the support base;

wherein the first massage portion comprises at least one first massage roller and at least one second massage roller that are arranged opposite to each other, and a gap is defined between the at least one first roller and the at least one second roller for accommodating a male penis;

wherein the at least one first massage roller and the at least one second roller are rotatable to stimulate two opposite sides of the male penis;

wherein the sex toy further comprises a clamping mechanism for driving the at least one first roller and the at least one second roller to move along a direction at an angle to an axial direction of the support base, to adjust a size of the gap between the at least one first roller and the at least one second roller;

wherein the sex toy further comprises a drive mechanism for driving the clamping mechanism to move along the axial direction of the support base; and wherein the drive mechanism comprises a drive assembly, a second transmission assembly, and a slider, the second transmission assembly connects the drive assembly to the slider, the slider is connected to the clamping mechanism; and wherein in use, the slider driven by the drive assembly and the second transmission assembly moves along the axial direction of the support base to move the at least one first roller and the at least one second roller axially.

20. A sex toy, comprising:

a support base; and a first massage portion mounted to the support base;

wherein the first massage portion comprises at least one first massage roller and at least one second massage roller that are arranged opposite to each other, and the at least first massage roller and the at least second massage roller are spaced in a lateral direction of the support base with a gap defined there between for accommodating a male penis;

wherein the at least one first massage roller and the at least one second roller are rotatable to stimulate two opposite sides of the male penis; and wherein the sex toy further comprises:

a negative pressure generator arranged in a massage space defined by the support base for changing air pressure in the massage space, a clamping mechanism for driving the at least one first roller and the at least one second roller to move along the lateral direction at an angle to an axial direction of the support base, and a drive mechanism for driving the at least one first massage roller and the at least one second roller to move along the axial direction of the support base.

* * * * *